(12) United States Patent
Fujisaki

(10) Patent No.: US 8,169,711 B2
(45) Date of Patent: May 1, 2012

(54) ZOOM LENS AND IMAGE PICKUP APPARATUS HAVING THE SAME

(75) Inventor: Toyokatsu Fujisaki, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 141 days.

(21) Appl. No.: 12/787,989

(22) Filed: May 26, 2010

(65) Prior Publication Data

US 2010/0302650 A1 Dec. 2, 2010

(30) Foreign Application Priority Data

May 26, 2009 (JP) ................................. 2009-126205

(51) Int. Cl.
*G02B 15/14* (2006.01)

(52) U.S. Cl. ........ 359/686; 359/683; 359/684; 359/685; 359/687; 359/690; 359/708; 359/713; 359/714; 359/715; 359/740; 359/772; 359/773; 359/774

(58) Field of Classification Search .......... 359/683–687, 359/690, 708, 713–715, 772–774, 740
See application file for complete search history.

(56) References Cited

U.S. PATENT DOCUMENTS

| | | | |
|---|---|---|---|
| 6,594,087 B2 | 7/2003 | Uzawa et al. | |
| 7,190,529 B2 | 3/2007 | Miyajima et al. | |
| 7,286,304 B1 | 10/2007 | Ohtake | |
| 2008/0180807 A1* | 7/2008 | Saruwatari | 359/687 |
| 2008/0291547 A1* | 11/2008 | Saruwatari | 359/687 |
| 2009/0021844 A1* | 1/2009 | Fujisaki | 359/687 |
| 2009/0109548 A1* | 4/2009 | Kimura | 359/690 |
| 2009/0116120 A1* | 5/2009 | Saruwatari | 359/686 |
| 2009/0161227 A1* | 6/2009 | Yamamoto et al. | 359/683 |

* cited by examiner

*Primary Examiner* — Evelyn A. Lester
(74) *Attorney, Agent, or Firm* — Rossi, Kimms & McDowell LLP

(57) ABSTRACT

A zoom lens comprises a first lens unit having a positive refractive power, a second lens unit having a negative refractive power, a third lens unit having a positive refractive power, and a rear group including at least one lens unit, in order from an object side to an image side. Each of the lens units is configured to move so that a total lens length at a wide-angle end is longer than that at a telephoto end to perform a zoom operation. A movement amount M1 of the first lens unit at the wide-angle end and the telephoto end with respect to an imaging surface, a focal length f1 of the first lens unit, and focal lengths fw and ft of a whole system at the wide-angle end and the telephoto end are appropriately set.

16 Claims, 13 Drawing Sheets

ZOOM LENS AND IMAGE PICKUP APPARATUS HAVING THE SAME

BACKGROUND OF THE INVENTION

1. Field of the Invention

The present invention relates to a zoom lens and an image pickup apparatus having the same, and more particularly relates to an image pickup apparatus using a solid-state image pickup element such as a video camera, an electronic still camera, a broadcasting camera, or a monitoring camera, or an image pickup apparatus using a silver salt film.

2. Description of the Related Art

An image pickup optical system used for an image pickup apparatus needs to be a zoom lens which has a short total lens length, a small size, a high zoom ratio, and a high resolution.

Commonly, in order to maintain a predetermined zoom ratio and also to reduce the size of a whole system, the refractive power of each lens unit constituting the zoom lens needs to be strengthened and also the number of the lenses needs to be reduced. However, in such a zoom lens, the thickness of the lens increases in order to ensure an edge thickness in accordance with the increase of the refractive power of each lens surface. In particular, a lens effective diameter increases and a whole of the lens system cannot be sufficiently shortened. At the same time, it is difficult to correct various kinds of aberrations such as a chromatic aberration at a telephoto end. Further, in accordance with the increase of the zoom ratio, an error which is caused by a tilt or a decentering in assembling a lens or a lens unit increases. When the sensitivity of the decentering of the lens or the lens unit is large, the optical performance is greatly deteriorated by the decentering or the optical performance is greatly deteriorated in an anti-shake operation. Therefore, it is preferable that the sensitivity of the decentering of each lens or each lens unit is reduced as much as possible.

A positive-lead type zoom lens which includes first, second, and third lens units having positive, negative, and positive refractive powers respectively, and a subsequent rear group including at least one lens unit in order from an object side to an image side is known. For example, a zoom lens which is constituted by four lens units having positive, negative, positive, and positive refractive powers in order from the object side to the image side is known (U.S. Pat. No. 7,190,529).

A zoom lens which is constituted by five lens units having positive, negative, positive, positive, and positive refractive powers in order from the object side to the image side is also known (U.S. Pat. No. 7,286,304).

Further, a zoom lens which is constituted by five lens units having positive, negative, positive, negative, and positive refractive powers in order from the object side to the image side is known (U.S. Pat. No. 6,594,087).

In these four-group zoom lens and five-group zoom lens, in order to realize a high zoom ratio and a reduction of the size of the whole lens system and also to obtain a good optical performance, it is important to appropriately set a refractive power or a lens configuration of each lens unit, a movement condition in a zoom operation of each lens unit, or the like. In particular, in order to reduce the lens effective diameter, to reduce the size of the whole of a camera, and also to well correct various kinds of aberrations such as a chromatic aberrations at the telephoto end, it is important to appropriately set the refractive power of the first lens unit, the movement condition of the first lens unit in the zoom operation, or the like. If these configurations are not appropriately set, it is difficult to reduce the size of the whole system and to obtain a zoom lens which has a wide field angle and a high zoom ratio and also has a high optical performance.

BRIEF SUMMARY OF THE INVENTION

The present invention provides a zoom lens which has a small-sized optical system in its entirety, has a wide field angle and a high zoom ratio, and also obtains a high optical performance in a whole zoom range.

A zoom lens as one aspect of the present invention comprises a first lens unit having a positive refractive power, a second lens unit having a negative refractive power, a third lens unit having a positive refractive power, and a rear group including at least one lens unit, in order from an object side to an image side. Each of the lens units is configured to move so that a total lens length at a wide-angle end is longer than that at a telephoto end to perform a zoom operation. The following conditional expressions are satisfied, where M1 is a movement amount of the first lens unit at the wide-angle end and the telephoto end with respect to an imaging surface, f1 is a focal length of the first lens unit, and fw and ft are focal lengths of a whole system at the wide-angle end and the telephoto end.

$$20.0 < f1/fw < 50.0$$

$$7.5 < M1/fw < 40.0$$

$$0.2 < M1/ft < 0.8$$

An image pickup apparatus as another aspect of the present invention comprises the zoom lens and a solid-state image pickup element configured to receive light of an image formed by the zoom lens.

Further features and aspects of the present invention will become apparent from the following description of exemplary embodiments with reference to the attached drawings.

DETAILED DESCRIPTION OF THE PREFERRED EMBODIMENTS

Exemplary embodiments of a zoom lens and an image pickup apparatus having the zoom lens of the present invention will be described below with reference to the accompanied drawings. The zoom lens of the present invention includes a first lens unit having a positive refractive power, a second lens unit having a negative refractive power, a third lens unit having a positive refractive power, and a rear group containing at least one lens unit, in order from an object side to an image side. The zoom lens moves the lens units so that a total lens length at a telephoto end is longer than that at a wide-angle end to perform a zoom operation.

Figure 1:
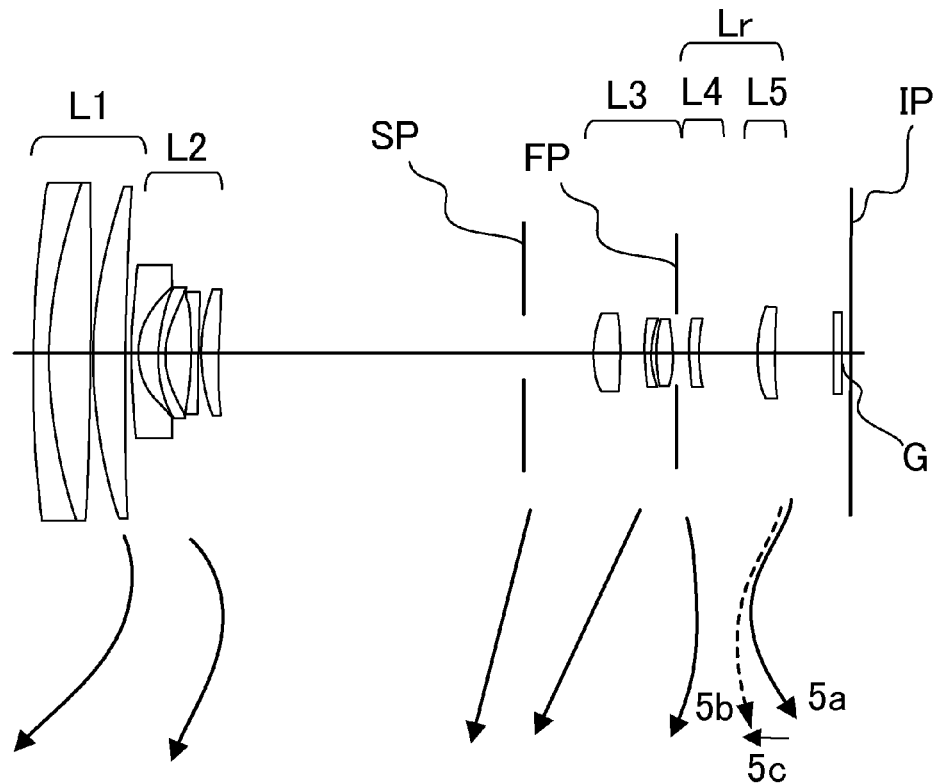
FIG. 1 is a cross-sectional diagram of a zoom lens at a wide-angle end in Embodiment 1 of the present invention.
Figure 2A:
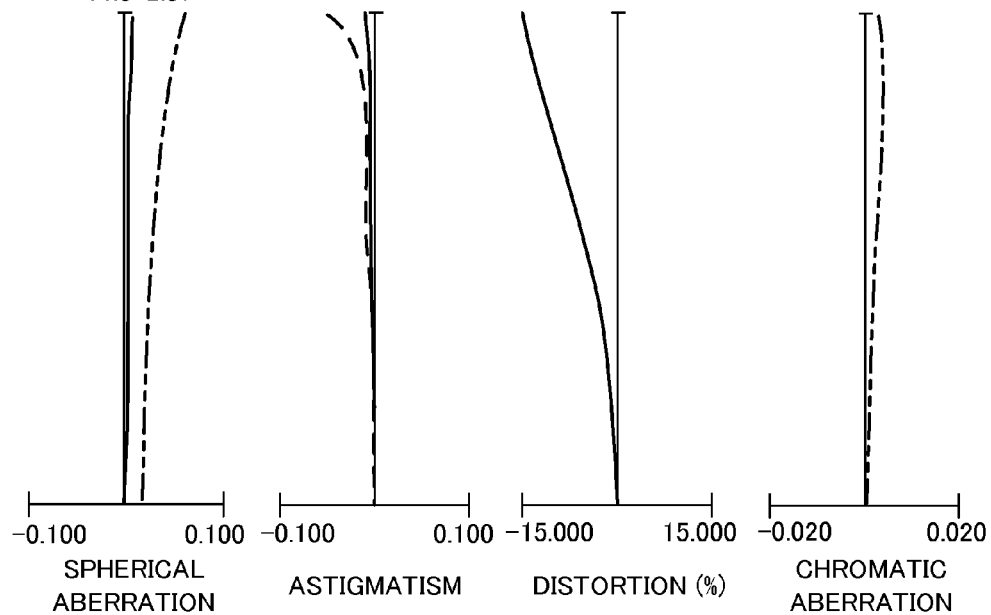
FIGS. 2A to 2c are aberration diagrams of a zoom lens at a wide-angle end, at an intermediate zoom position, and at a telephoto end, respectively, in Embodiment 1 of the present invention.
Figure 2B:
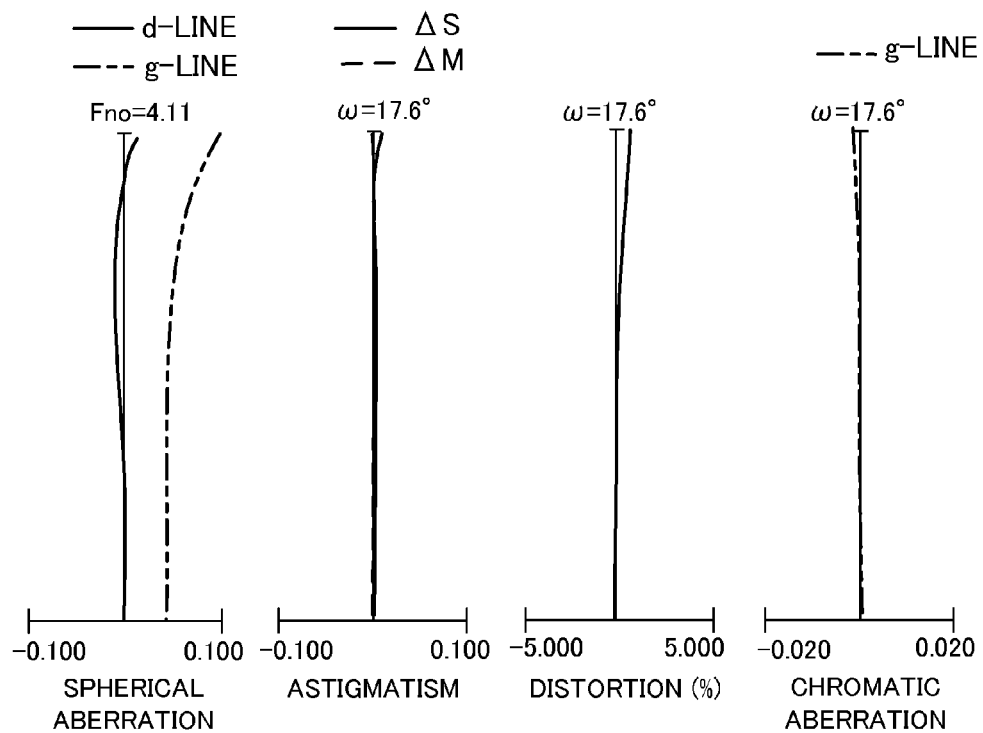
Figure 2C:
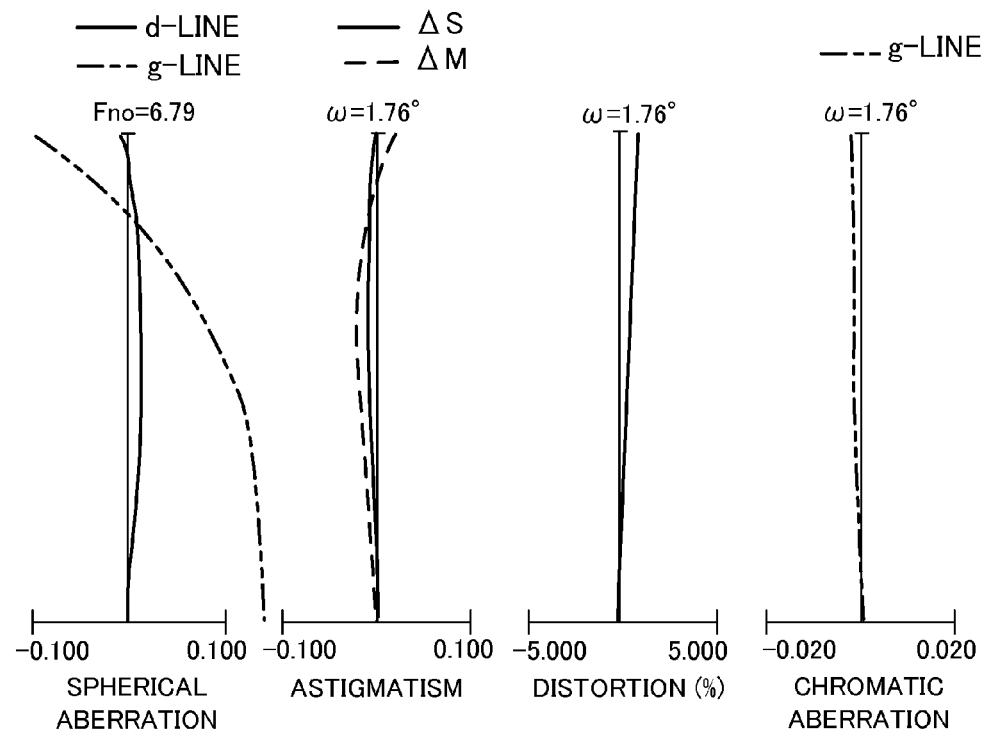
Figure 3:
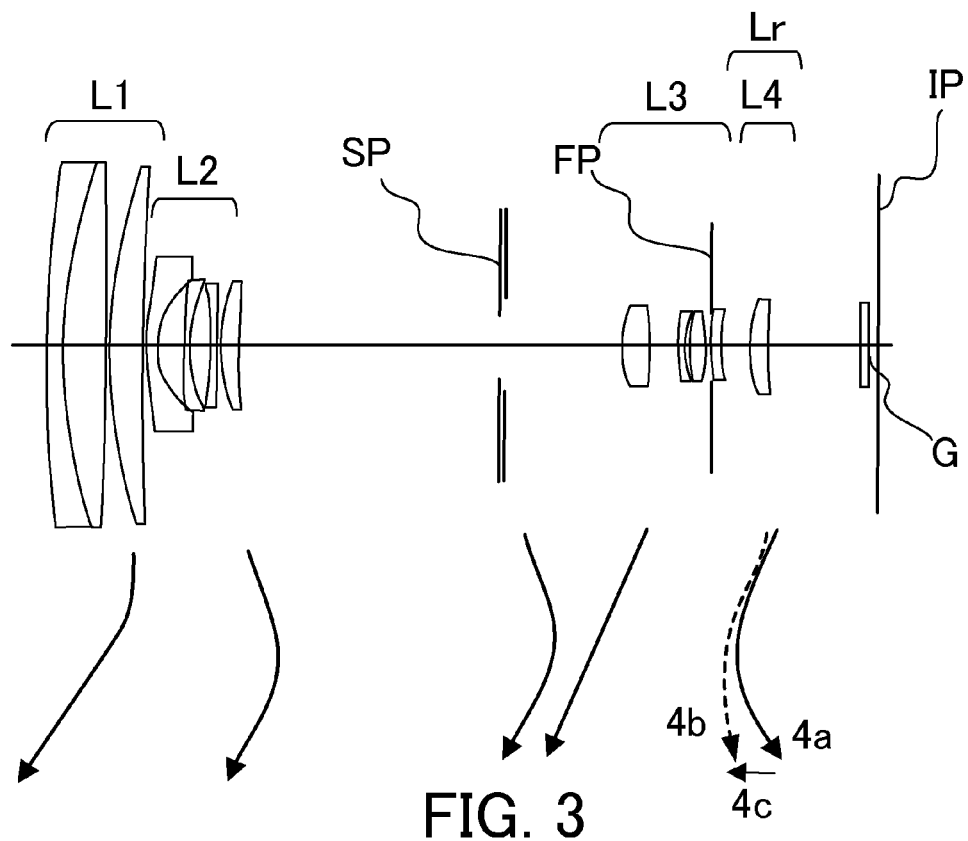
FIG. 3 is a cross-sectional diagram of a zoom lens at a wide-angle end in Embodiment 2 of the present invention.
Figure 4A:
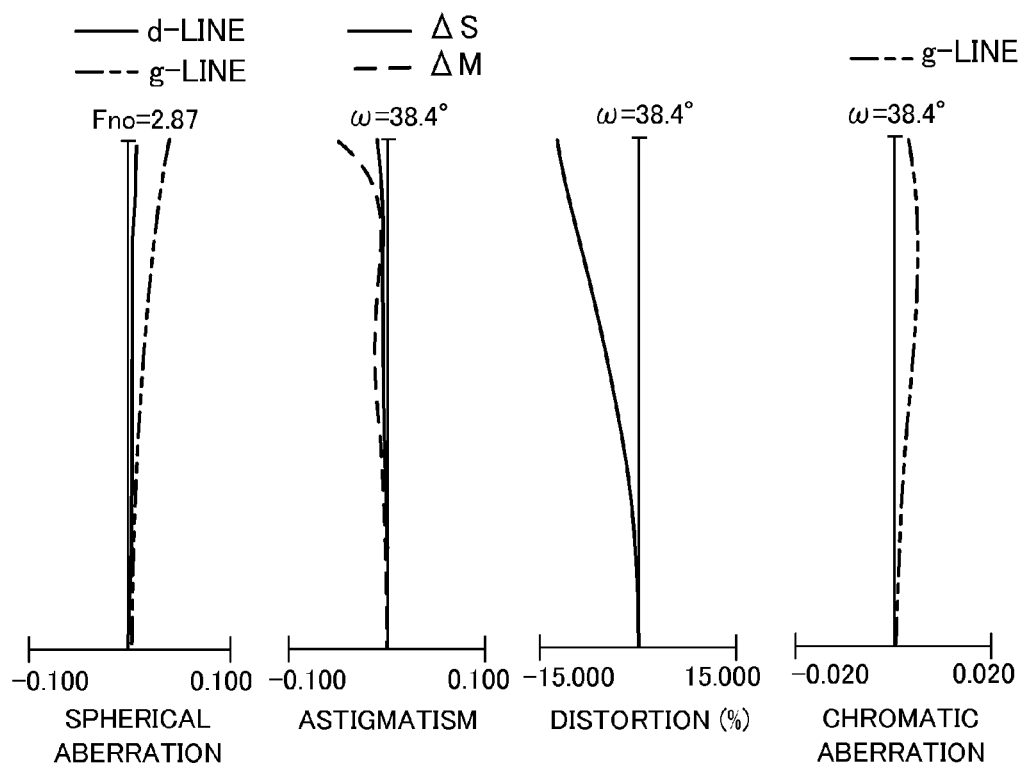
FIGS. 4A to 4C are aberration diagrams of a zoom lens at a wide-angle end, at an intermediate zoom position, and at a telephoto end, respectively, in Embodiment 2 of the present invention.
Figure 4B:
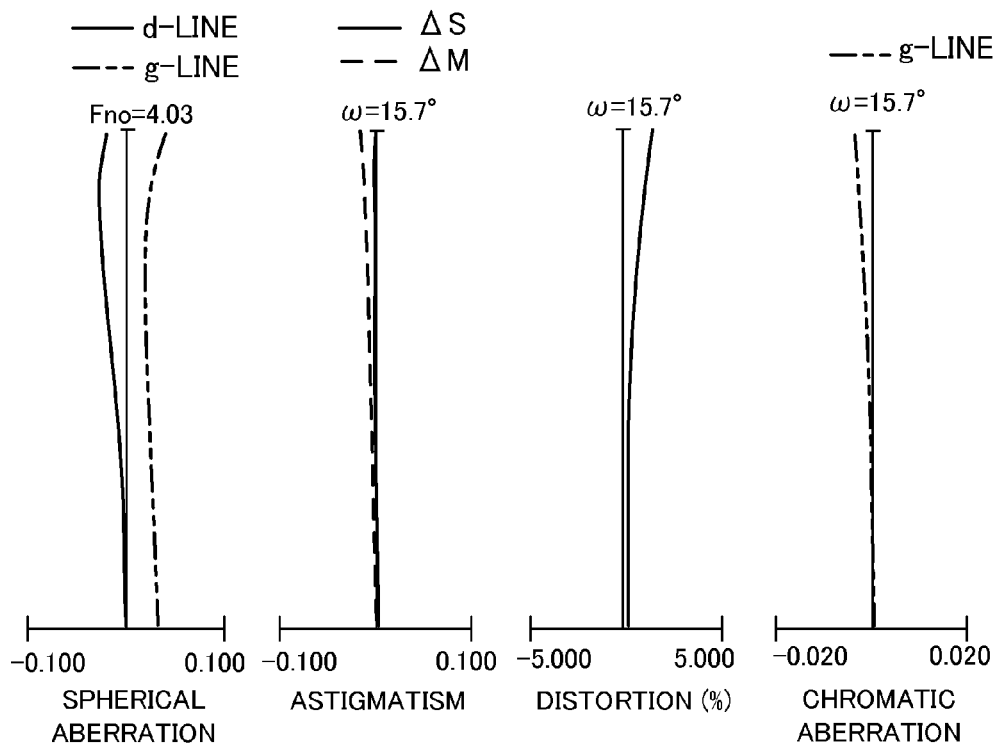
Figure 4C:
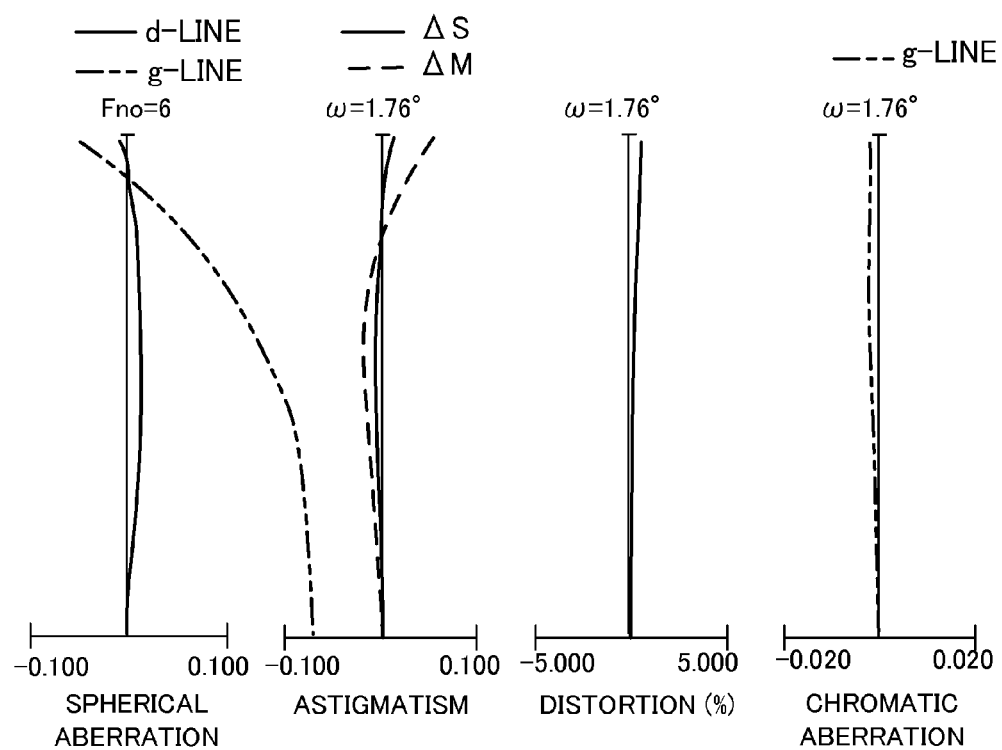
Figure 5:
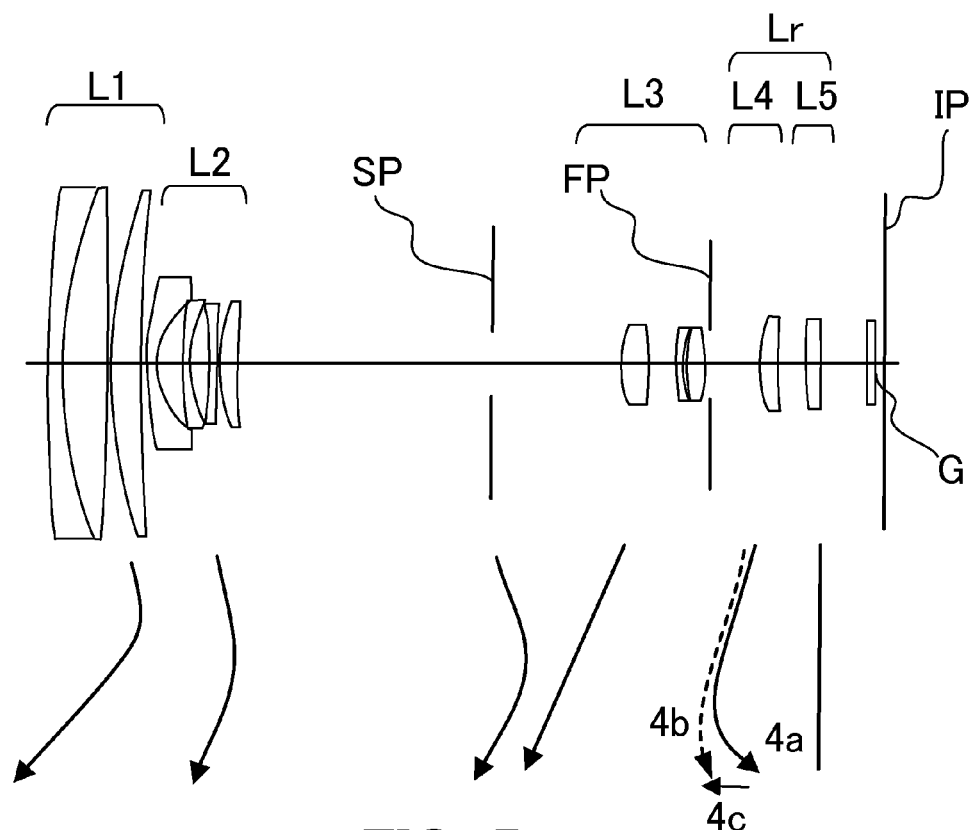
FIG. 5 is a cross-sectional diagram of a zoom lens at a wide-angle end in Embodiment 3 of the present invention.
Figure 6A:
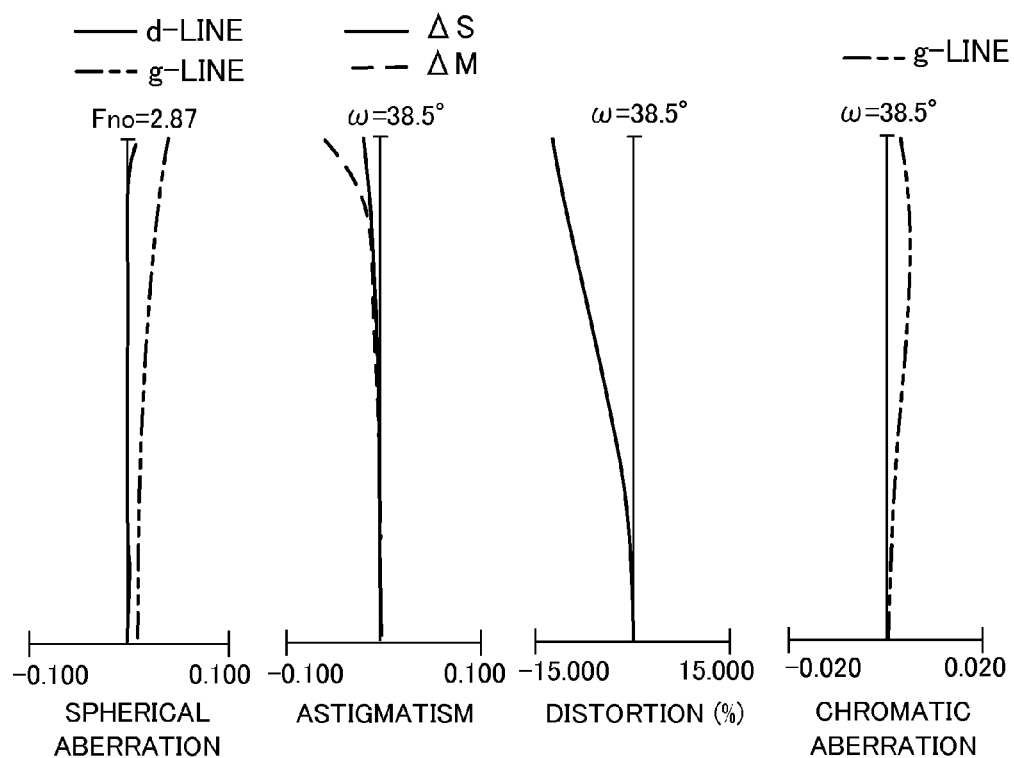
FIGS. 6A to 6C are aberration diagrams of a zoom lens at a wide-angle end, at an intermediate zoom position, and at a telephoto end, respectively, in Embodiment 3 of the present invention.
Figure 6B:
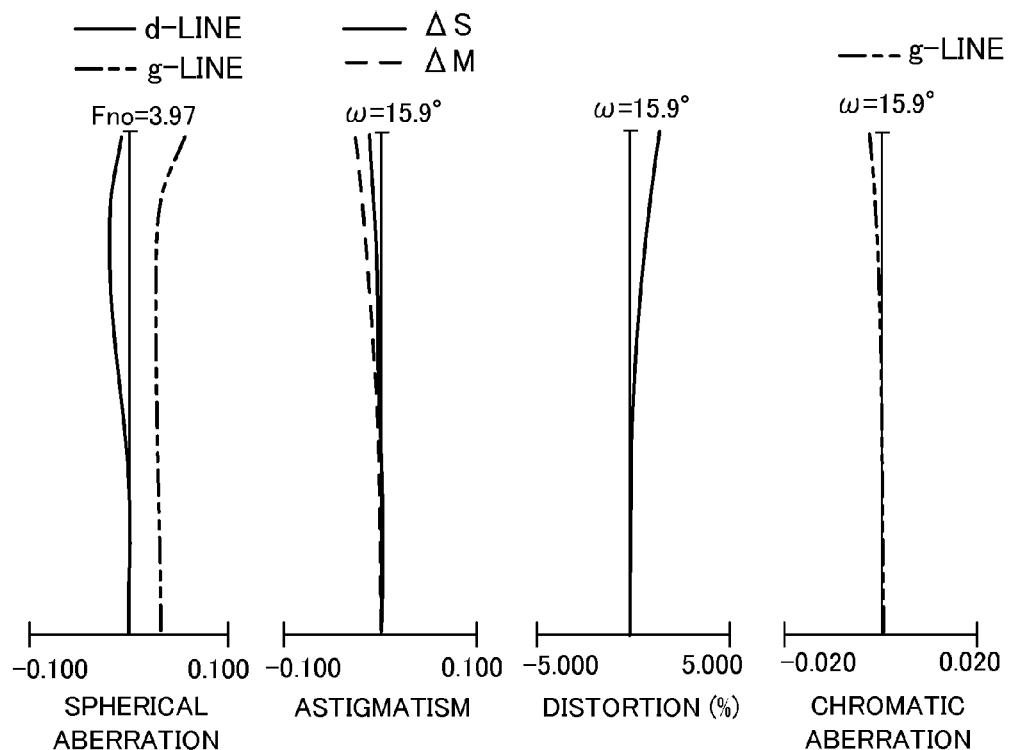
Figure 6C:
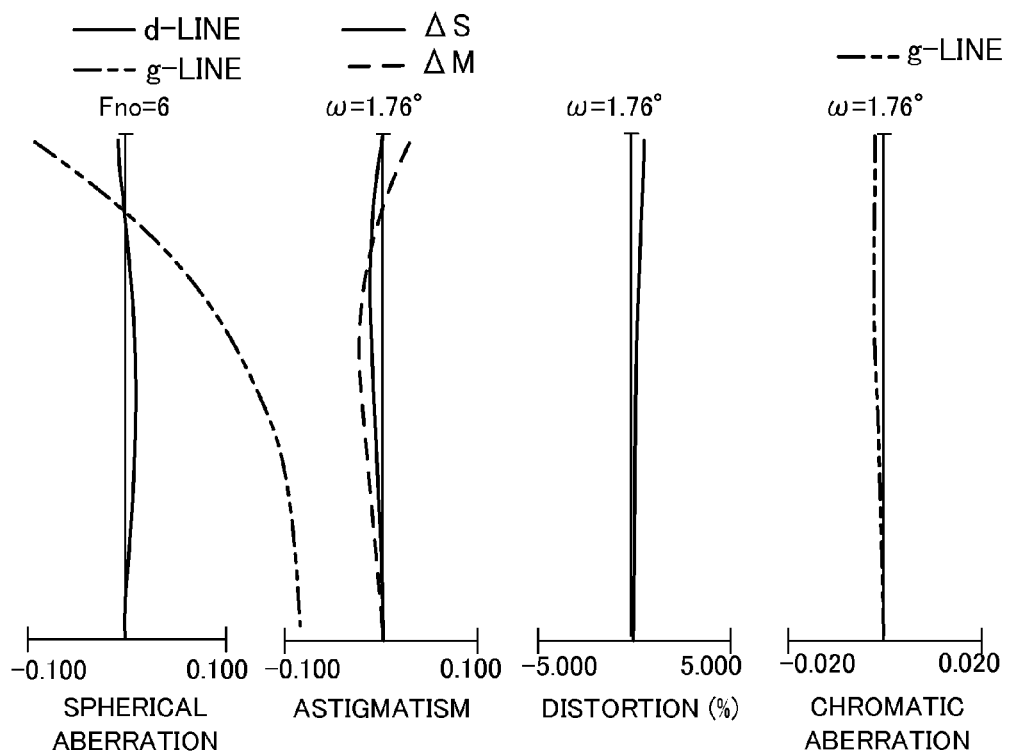
Figure 7:
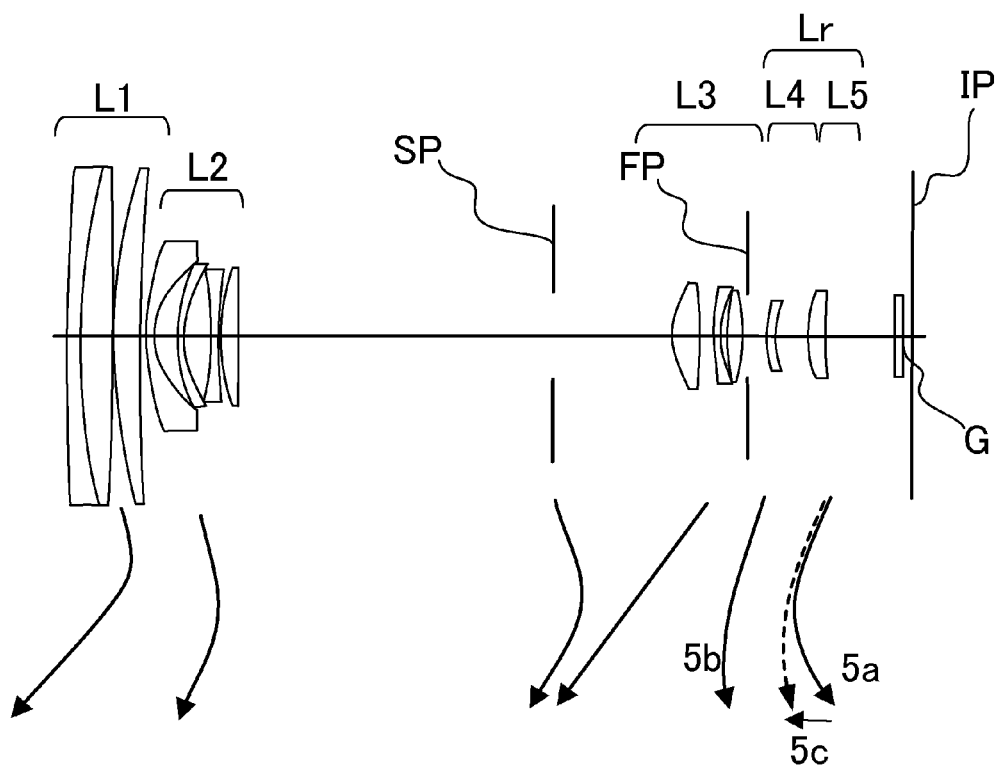
FIG. 7 is a cross-sectional diagram of a zoom lens at a wide-angle end in Embodiment 4 of the present invention.
Figure 8A:
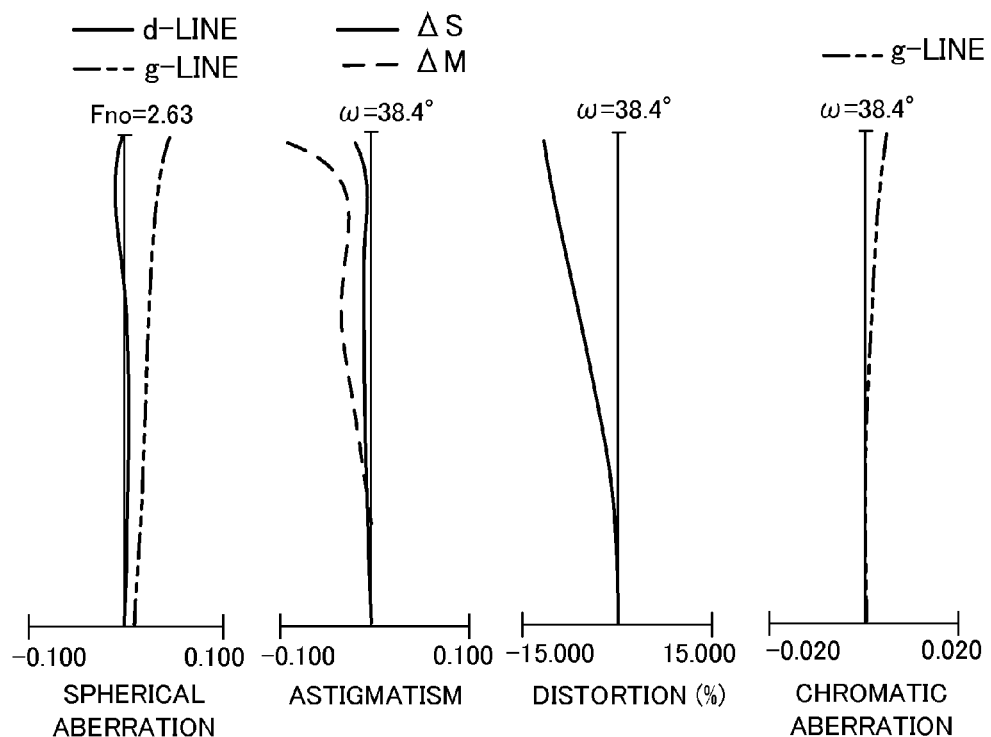
FIGS. 8A to 8C are aberration diagrams of a zoom lens at a wide-angle end, at an intermediate zoom position, and at a telephoto end, respectively, in Embodiment 4 of the present invention.
Figure 8B:
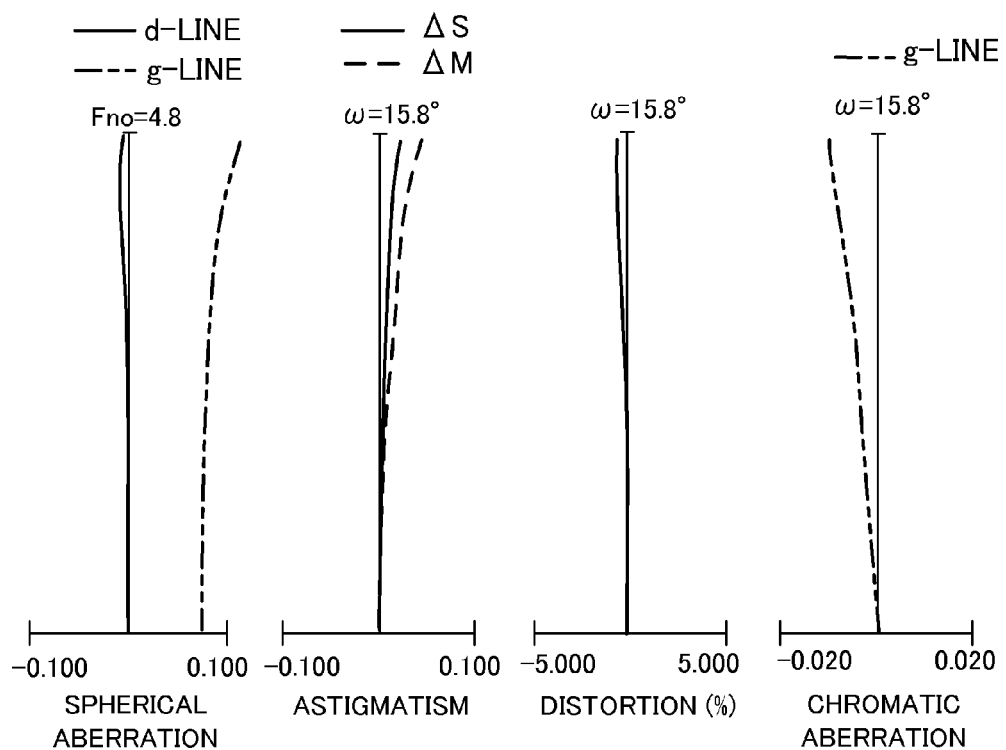
Figure 8C:
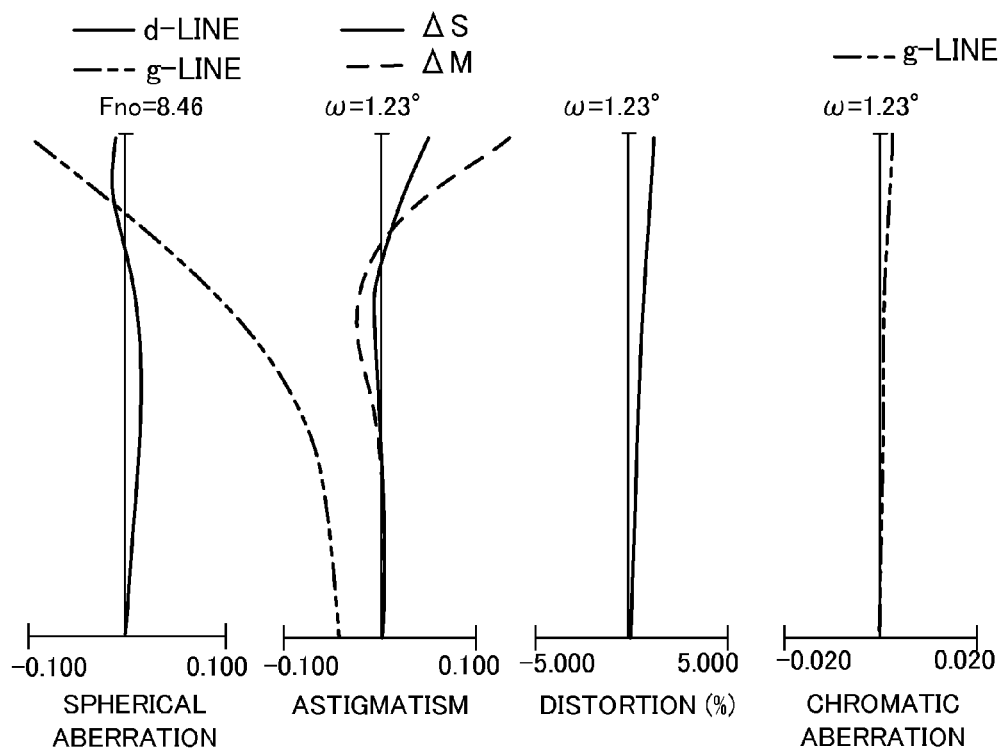
Figure 9:
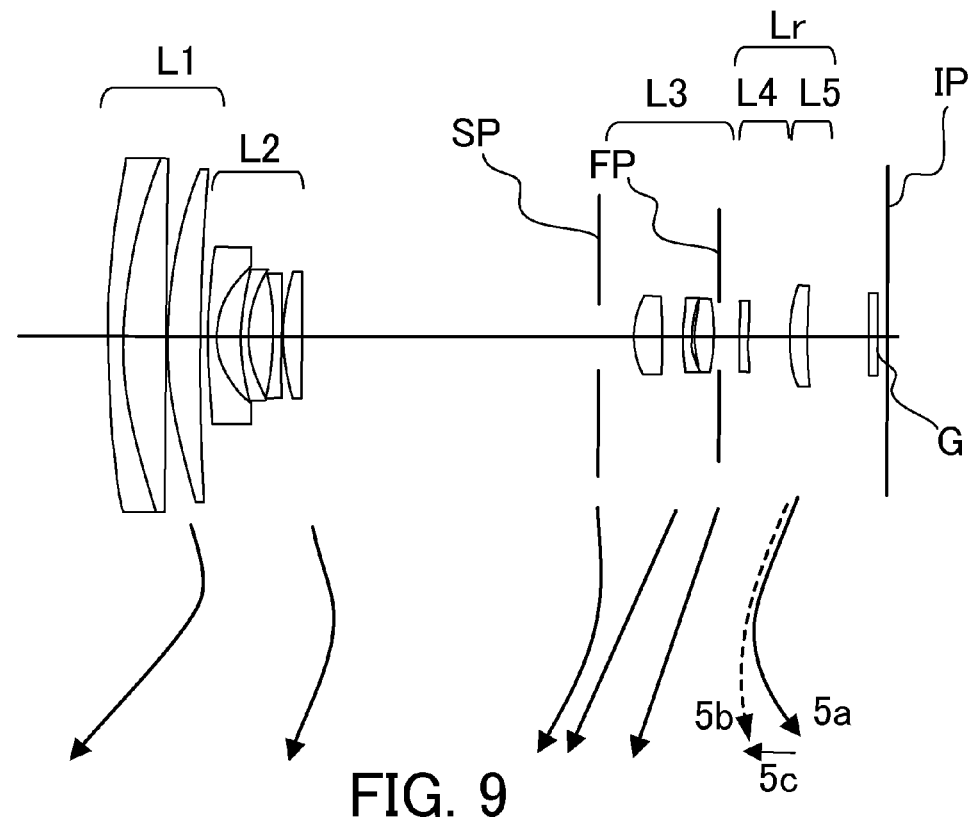
FIG. 9 is a cross-sectional diagram of a zoom lens at a wide-angle end in Embodiment 5 of the present invention.
Figure 10A:
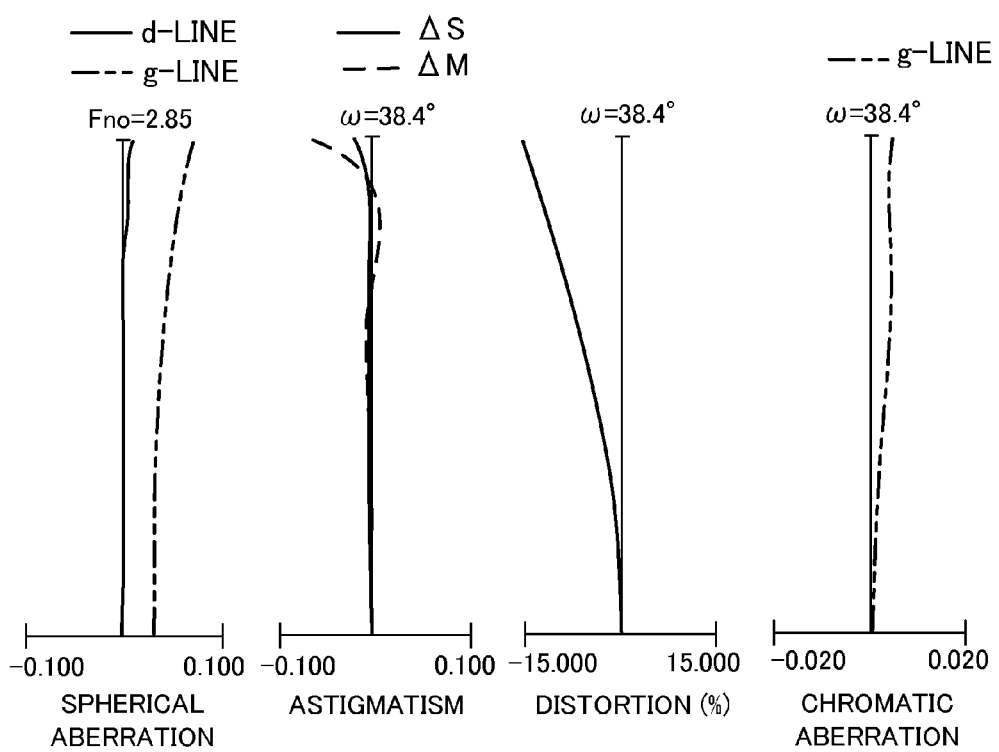
FIGS. 10A to 10C are aberration diagrams of a zoom lens at a wide-angle end, at an intermediate zoom position, and at a telephoto end, respectively, in Embodiment 5 of the present invention.
Figure 10B:
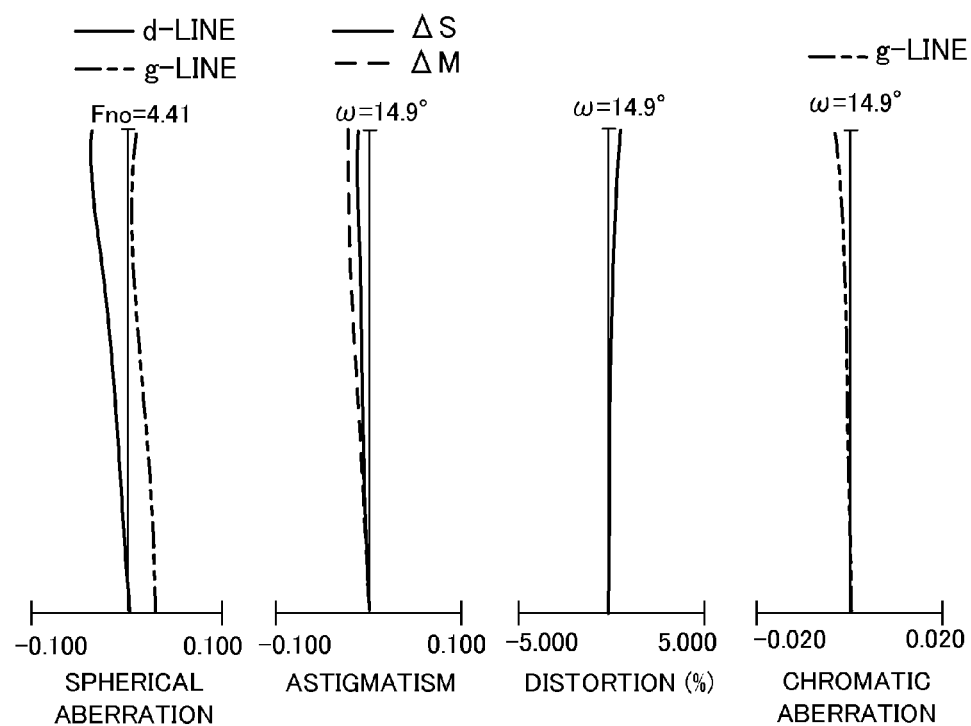
Figure 10C:
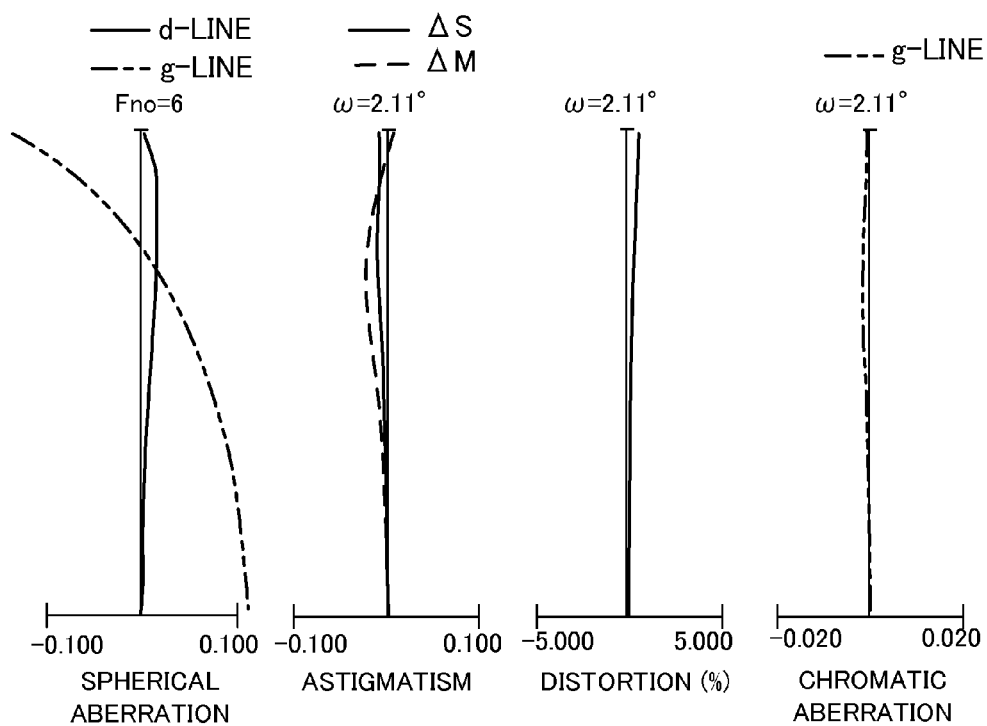
Figure 11:
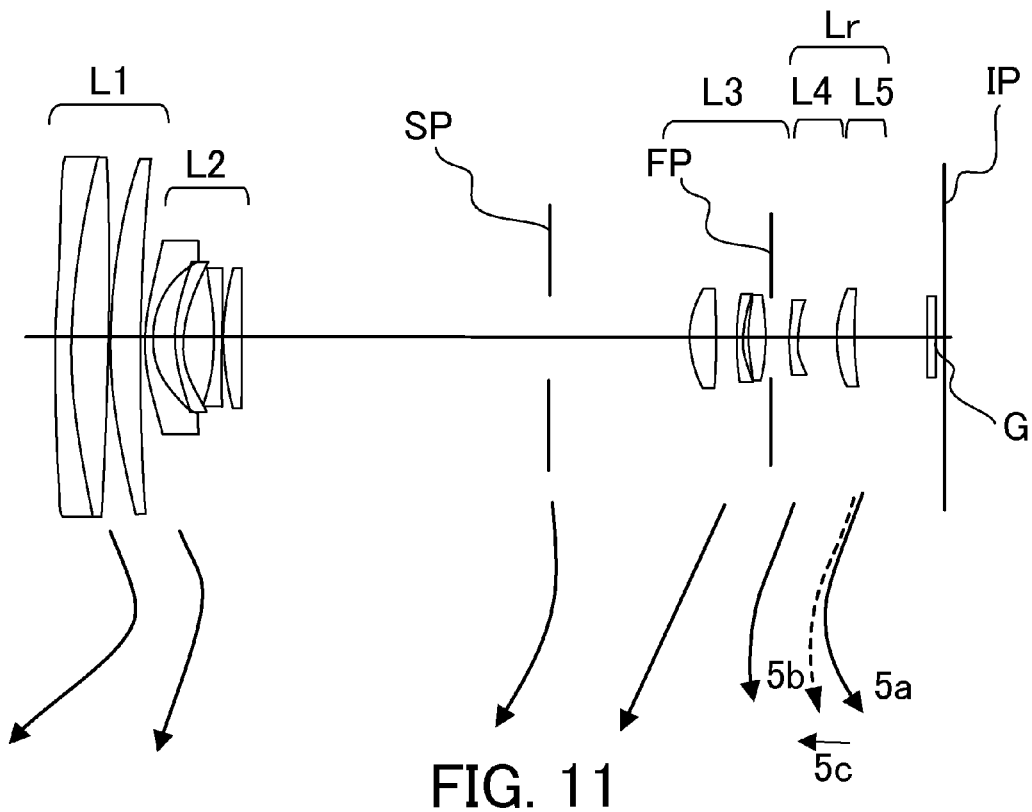
FIG. 11 is a cross-sectional diagram of a zoom lens at a wide-angle end in Embodiment 6 of the present invention.
Figure 12A:
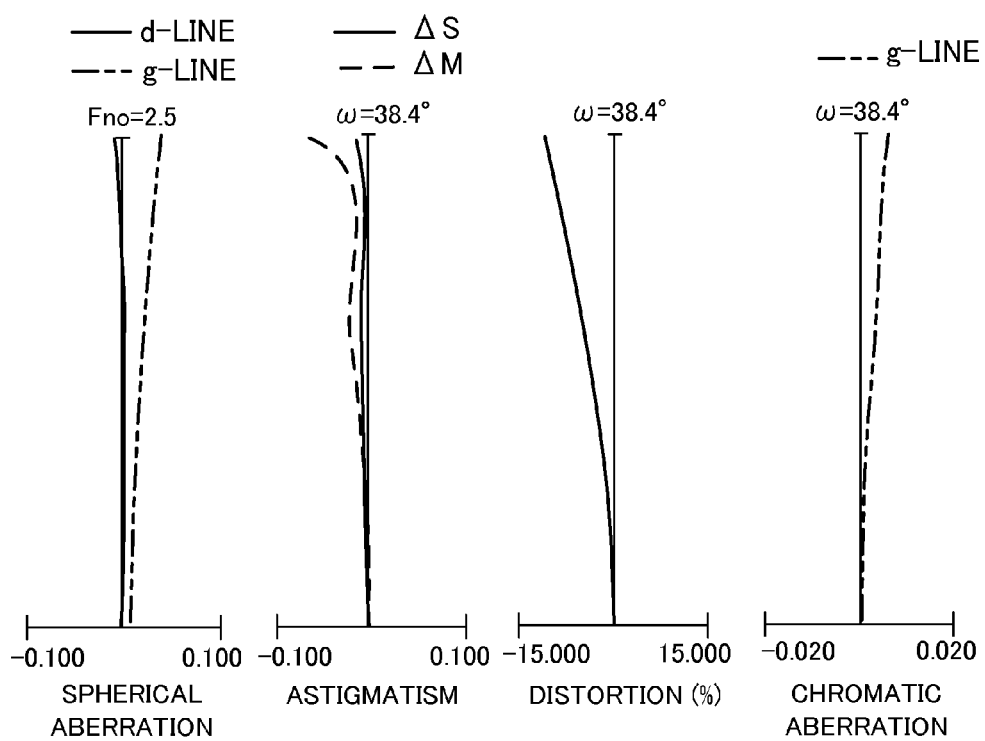
FIGS. 12A to 12C are aberration diagrams of a zoom lens at a wide-angle end, at an intermediate zoom position, and at a telephoto end, respectively, in Embodiment 6 of the present invention.
Figure 12B:
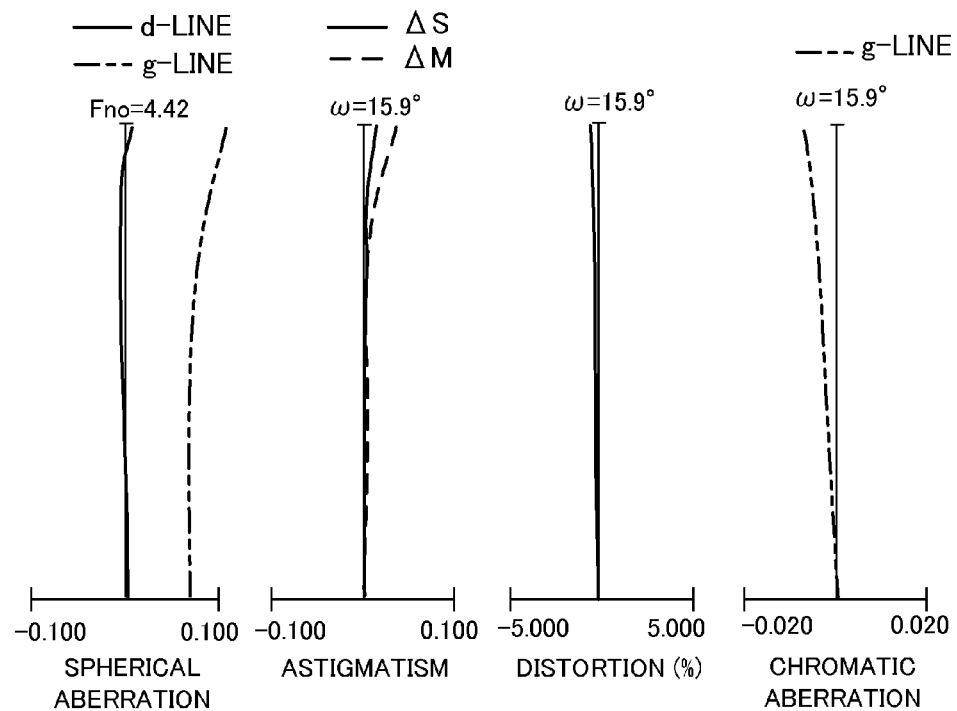
Figure 12C:
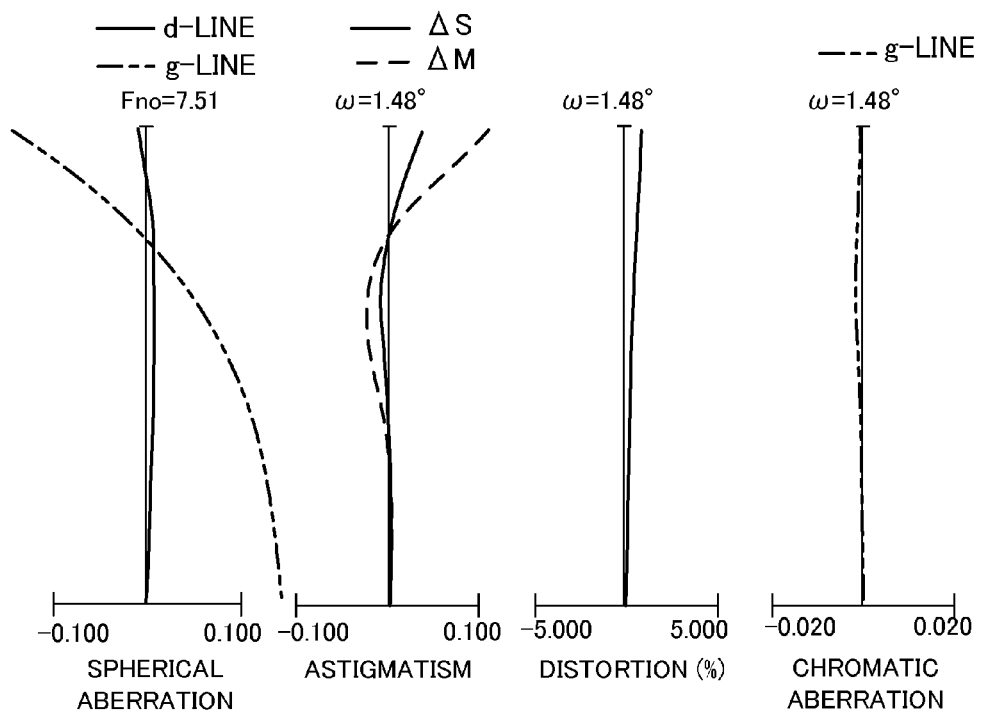
Figure 13:
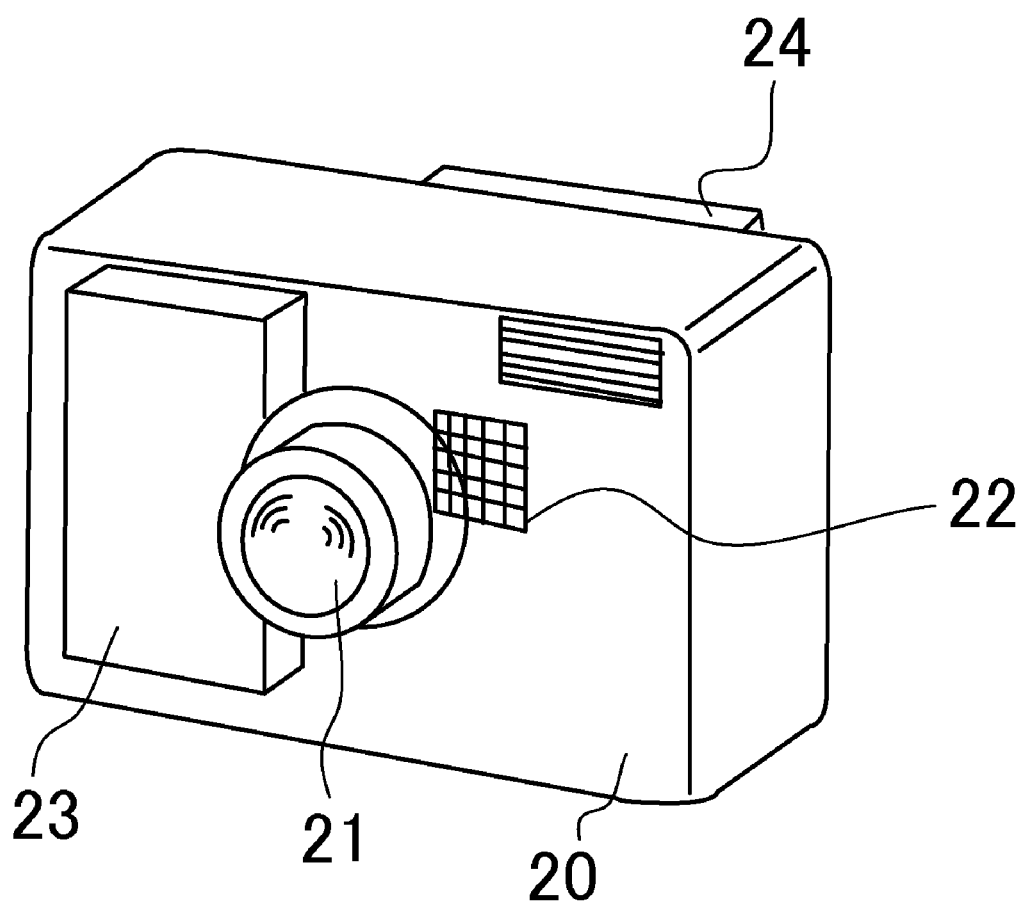
FIG. 13 is a main schematic diagram of an image pickup apparatus of the present invention.

FIG. 1 is a cross-sectional diagram of a zoom lens at a wide-angle end (a short focal length end) in Embodiment 1 of the present invention. FIGS. 2A to 2c are aberration diagrams of a zoom lens at a wide-angle end, at an intermediate zoom position, and at a telephoto end (a long focal length end), respectively, in Embodiment 1 of the present invention. FIG. 3 is a cross-sectional diagram of a zoom lens at a wide-angle end in Embodiment 2 of the present invention. FIGS. 4A to 4C are aberration diagrams of a zoom lens at a wide-angle end, at an intermediate zoom position, and at a telephoto end, respectively, in Embodiment 2 of the present invention. FIG. 5 is a cross-sectional diagram of a zoom lens at a wide-angle end in Embodiment 3 of the present invention. FIGS. 6A to 6C are aberration diagrams of a zoom lens at a wide-angle end, at an intermediate zoom position, and at a telephoto end, respectively, in Embodiment 3 of the present invention. FIG. 7 is a cross-sectional diagram of a zoom lens at a wide-angle end in Embodiment 4 of the present invention. FIGS. 8A to 8C are aberration diagrams of a zoom lens at a wide-angle end, at an intermediate zoom position, and at a telephoto end, respectively, in Embodiment 4 of the present invention. FIG. 9 is a cross-sectional diagram of a zoom lens at a wide-angle end in Embodiment 5 of the present invention. FIGS. 10A to 10C are aberration diagrams of a zoom lens at a wide-angle end, at an intermediate zoom position, and at a telephoto end, respectively, in Embodiment 5 of the present invention. FIG. 11 is a cross-sectional diagram of a zoom lens at a wide-angle end in Embodiment 6 of the present invention. FIGS. 12A to 12C are aberration diagrams of a zoom lens at a wide-angle end, at an intermediate zoom position, and at a telephoto end, respectively, in Embodiment 6 of the present invention. FIG. 13 is a main schematic diagram of a camera (an image pickup apparatus) including a zoom lens of the present invention. The zoom lens of each embodiment is an image pickup lens system which is used for an image pickup apparatus such as a video camera, a digital camera, a TV camera, or a silver salt film camera. In the cross-sectional diagrams of the zoom lens, the left hand indicates an object side (a front side) and the right hand indicates an image side (a rear side). In the cross-sectional diagrams of the zoom lens, reference code "i" denotes an order of a lens unit from the object side, and reference code "Li" denotes an i-th lens unit. Reference code "Lr" denotes a rear group containing at least one lens unit.

In the cross-sectional diagrams of Embodiments 1, 4 to 6 shown in FIGS. 1, 7, 9, and 11, respectively, reference code "L1" denotes a first lens unit having a positive refractive power, reference code "L2" denotes a second lens unit having a negative refractive power, and reference code "L3" denotes a third lens unit having a positive refractive power. Rear group Lr is constituted by a fourth lens unit L4 having a negative refractive power and a fifth lens unit L5 having a positive refractive power. Each of Embodiments 1, and 4 to 6 is a positive-lead type five groups zoom lens which is constituted by five lens units. In the cross-sectional diagram of the zoom lens of Embodiment 2 shown in FIG. 3, reference code "L1" denotes a first lens unit having a positive refractive power, reference code "L2" denotes a second lens unit having a negative refractive power, and reference code "L3" denotes a third lens unit having a positive refractive power. The rear group Lr is constituted by a fourth lens unit L4 having a positive refractive power. Embodiment 2 is a positive-lead type four groups zoom lens which is constituted by four lens units. In the lens cross-sectional configuration of Embodiment 3 shown in FIG. 5, reference code "L1" denotes a first lens unit having a positive refractive power, reference code "L2" denotes a second lens unit having a negative refractive power, and reference code "L3" denotes a third lens unit having a positive refractive power. The rear group Lr is constituted by a fourth lens unit L4 having a positive refractive power and a fifth lens unit L5 having a positive refractive power. Embodiment 3 is a positive-lead type five groups zoom lens which is constituted by five lens units.

In each embodiment, reference code "SP" denotes an aperture stop and is disposed at the object side of the third lens unit L3. Reference code "FP" denotes a flare stop and is disposed at the image side of the third lens unit L3 to shield unnecessary light. Reference code "G" denotes an optical block which corresponds to an optical filter, a face plate, a crystal low-pass filter, an infrared cut filter, or the like. Reference code "IP" denotes an image plane where a photo-sensitive surface corresponding to an imaging surface of a solid-state image pickup element (a photoelectric conversion element) such as a CCD sensor or a CMOS sensor when the zoom lens is used as an image pickup optical system of the video camera or the digital camera or corresponding to a film surface when the zoom lens is used for the silver salt film camera is disposed. In the aberration diagrams, reference codes "d" and "g" denote d-line and g-line, respectively. Reference codes "ΔM" and "ΔS" denote meridional image plane and sagittal image plane, respectively, and a chromatic aberration of magnification is represented by the g-line. Reference code "ω" denotes a half field angle (a value of half of an imaging field angle), and reference code "Fno" denotes an F-number. In each embodiment described below, the wide-angle end and the telephoto end are defined as zoom positions when the magnification varying lens unit is structurally positioned at both ends in a range movable on an optical axis. In each embodiment, each lens unit moves as indicated by an arrow in a zoom operation from the wide-angle end to the telephoto end.

In Embodiments 1, 4, 5, and 6 shown in FIGS. 1, 7, 9, and 11 respectively, the first lens unit L1 traces a locus of a convex shape to move to the image side in performing a zoom operation from the wide-angle end to the telephoto end as indicated by arrows. The second lens unit L2 convexly and nonlinearly moves to the image side. The third lens unit L3 moves to the object side. The fourth lens unit L4 moves to the object side or the image side, and the fifth lens unit traces a locus of a convex shape to move to the object side. The aperture stop SP moves independently of other lens units. The flare cut stop FP moves integrally with the third lens unit L3. A rear focus mode which performs a focus operation while moving the fifth lens unit L5 on an optical axis is adopted. When the focusing operation from an infinitely distant object to a near object is performed at the telephoto end, as indicated by an arrow 5c in each cross-sectional diagram of the zoom lens, the fifth lens unit L5 is moved forward. A solid curve line 5a and a dotted curve line 5b relating to the fifth lens unit L5 indicate movement loci for correcting a field variation in a zoom operation from the wide-angle end to the telephoto end on condition of focusing on the infinitely distant object and the near object, respectively.

In Embodiments 1, 4, 5, and 6, the third lens unit L3 having a positive refractive power is moved in a direction perpendicular to an optical axis to correct an image blur when a whole optical system (a zoom lens) is shaken (is tilted). In Embodiment 2 shown in FIG. 3, when a zoom operation from the wide-angle end to the telephoto end is performed, the first lens unit L1 traces a locus of a convex shape to move to the image side as indicated by an arrow. The second lens unit L2 convexly and nonlinearly moves to the image side. The third lens unit L3 moves to the object side. The fourth lens unit L4 traces a locus of a convex shape to move to the object side. The aperture stop SP moves independently of other lens units. The flare cut stop FP moves integrally with the third lens unit L3. A rear focus mode which performs a focus operation while moving the fourth lens unit L4 on an optical axis is adopted. When the focus operation from an infinitely distant object to a near object is performed at the telephoto end, as indicated by an arrow 4c in the cross-sectional diagram of the zoom lens, the fourth lens unit L4 is moved forward. A solid curve line 4a and a dotted curve line 4b relating to the fourth lens unit L4 indicate movement loci for correcting a field variation in a zoom operation from the wide-angle end to the telephoto end on condition of focusing on the infinitely distant object and the near object, respectively. Further, in Embodiment 2, the third lens unit L3 having a positive refractive power is moved in a direction perpendicular to the optical axis to correct an image blur when a whole optical system (a zoom lens) is shaken (is tilted).

In Embodiment 3 shown in FIG. 5, when a zooming operation from the wide-angle end to the telephoto end is performed, the first lens unit L1 traces a locus of a convex shape to move to the image side as indicated by an arrow. The second lens unit L2 convexly and nonlinearly moves to the image side. The third lens unit L3 moves to the object side. The fourth lens unit L4 traces a locus of a convex shape to move to the object side. The fifth lens unit L5 does not move in the zoom operation. Although the first to fourth lens units move in the zoom operation, the fifth lens unit L5 may also be moved independently of other lens units in the zoom operation if necessary. The aperture stop SP moves independently of other lens units. The flare cut stop FP moves integrally with the third lens unit L3. A rear focus mode which performs a focus operation while moving the fourth lens unit L4 on an optical axis is adopted. When a focusing operation from an infinitely distant object to a near object is performed at the telephoto end, as indicated by an arrow 4c in the cross-sectional diagram of the zoom lens, the fourth lens unit L4 is moved forward. A solid curve line 4a and a dotted curve line 4b relating to the fourth lens unit L4 indicate movement loci for correcting a field variation in the zoom operation from the wide-angle end to the telephoto end on condition of focusing on the infinitely distant object and the near object, respectively. Further, in Embodiment 3, the third lens unit L3 having a positive refractive power is moved in a direction perpendicular to the optical axis to correct an image blur when a whole optical system (a zoom lens) is shaken (is tilted).

In each embodiment, in a zoom operation, both the first lens unit L1 and the third lens unit L3 are moved so as to be positioned at the object side in a case of the wide-angle end as compared with a case of the telephoto end. Thus, the total lens length at the wide-angle end is shortened and also a high zoom ratio (magnification varying ratio) is obtained. In particular, in each embodiment, in the zoom operation from the wide-angle end to the telephoto end, the third lens unit L3 is moved to the object side to share the magnification varying function with the third lens unit L3. Further, the first lens unit L1 having a positive refractive power is moved to the object side so that the second lens unit L2 has a large amount of magnification varying effect to obtain a high zoom ratio of at least 20 times without increasing the refractive powers of the first lens unit L1 and the second lens unit L2. In the zoom lens of each embodiment, a rear focus mode which performs a focus operation while moving the fourth lens unit L4 or the fifth lens unit L5 on an optical axis is adopted.

In Embodiments 1, 4 to 6, the focus operation from the infinitely distant object to the near object at the telephoto end may also be performed by the fourth lens unit L4. When the focus operation from the infinitely distant object to the near object at the telephoto end is performed, the fourth lens unit L4 having a negative refractive power is moved backward. Further, in each embodiment, the third lens unit L3 having a positive refractive power is moved so as to have a component in a direction perpendicular to the optical axis to displace an image in the direction perpendicular to the optical axis. Thus, an image blur when a whole optical system (a zoom lens) is shaken (is tilted) is corrected. In each embodiment, an anti-shake operation is performed without adding an optical member such as a variable apex angle prism or a lens unit for the anti-shake operation, and therefore growth in size of a whole of the optical system is prevented. In each embodiment, the third lens unit L3 is moved in a direction perpendicular to the optical axis to perform the anti-shake operation, but any other movement mode can also be performed to correct the shake of the image if the third lens unit L3 is moved so as to have a component in a direction perpendicular to the optical axis. For example, if the complication of a lens barrel structure is permitted, the third lens unit L3 may also be rotated so as to have a rotation center on the optical axis to perform the anti-shake operation. Further, in each embodiment, the aperture stop SP moves independently of each lens unit in the zoom operation. Thus, an abrupt decrease of a light intensity in the periphery of a screen with respect to an intermediate image height at the wide-angle end and its adjacent zoom position is prevented.

In order to reduce an effective lens diameter of the first lens unit L1, it is preferable that the number of the lenses constituting the first lens unit L1 is smaller. Therefore, the first lens unit L1 is constituted by three lenses of a negative lens, a positive lens, and a positive lens, in order from the object side to the image side. Specifically, in each embodiment, the first lens unit L1 is constituted by a cemented lens which is made of cementing a negative lens and a positive lens, and a positive lens. Thus, an aspherical aberration and a chromatic aberration which are generated when a zoom ratio is heightened are well corrected. The third lens unit L3 includes one negative lens and two positive lenses. Specifically, in each embodiment, the third lens unit L3 is constituted by a positive lens, a negative lens, and a positive lens in order from the object side to the image side. Thus, a coma aberration which is generated during the anti-shake operation is well corrected. Further, the third lens unit L3 is configured so as to have at least one aspherical surface. Thus, the variation of a spherical aberration generated by the zoom operation is well corrected. In Embodiments 2 and 3, the fourth lens unit L4 is constituted by one positive lens having a surface of a convex shape at the object side. In Embodiment 3 shown in FIG. 5, the fifth lens unit L5 having a positive refractive power which does not move (is fixed) with respect to the image plane in the zoom operation is arranged at a position closest to the image side. The arrangement contributes to a correction of various kinds of aberrations such as a field curvature, a reduction in size of the lens effective diameter, and a magnification varying operation.

In each embodiment, a movement amount of the first lens unit L1 at the wide-angle end and the telephoto end with respect to the imaging surface is defined as M1. A focal length of the first lens unit L1 is defined as f1, and focal lengths of a whole system at the wide-angle end and the telephoto end are defined as fw and ft, respectively. In this case, the following conditional expressions are satisfied.

$$20.0 < f1/fw < 50.0 \quad (1)$$

$$7.5 < M1/fw < 40.0 \quad (2)$$

$$0.2 < M1/ft < 0.8 \quad (3)$$

The movement amount M1 corresponds to a displacement (a positional difference) with respect to the image plane in the optical axis direction at the telephoto end as compared with the wide-angle end. The sign of the movement amount M1 is positive.

In each embodiment, in the zoom operation (the magnification varying operation) from the wide-angle end to the telephoto end, the first lens unit moves with respect to the imaging surface so that the total lens length (from the first lens surface to the image plane) at the telephoto end is longer than that at the wide-angle end. Thus, the lens effective diameter is reduced while realizing the wide field angle and the high zoom ratio. Conditional expression (1) appropriately determines a ratio of the focal length f1 of the first lens unit L1 which contributes to the magnification varying operation and the focal length fw of the whole system at the wide-angle end in order to reduce the size of the whole system and to widen the field angle and also to increase the zoom ratio. When Conditional expression (1) exceeds the lower limit and the focal length f1 of the first lens unit L1 is smaller than the focal length fw of the whole system at the wide-angle end, it is difficult to correct a chromatic aberration of magnification at the telephoto end if the field angle is widened. An axial chromatic aberration and the chromatic aberration of magnification increase at the telephoto end if the zoom ratio is heightened. It is not good because it is difficult to ensure the thickness of an edge of a positive lens which constitutes the first lens unit L1 and the effective diameter has to be increased for manufacturing the zoom lens. Further, a decentering sensitivity of the first lens unit L1 is increased when the zoom lens is assembled, and it causes a deterioration of an optical performance. On the contrary, when Conditional expression (1) exceeds the upper limit and the focal length f1 of the first lens unit L1 is larger than the focal length fw of the whole system at the wide-angle end, the movement amount of the first lens unit L1 becomes large during the zoom operation in a high zoom ratio and the size of the whole system is increased. A spherical aberration at the telephoto end is also increased. Further, it is not good because the movement amount of the first lens unit L1 during the zoom operation is increased and an image shake or a shaking sound during the zooming operation is increased.

Conditional expression (2) appropriately determines a ratio of the movement amount M1 of the first lens unit L1 which contributes to the magnification varying operation with respect to the image plane and the focal length fw of the whole system at the wide-angle end in order to reduce the size of the whole system and to widen the field angle and also to increase the zoom ratio. When Conditional expression (2) exceeds the lower limit, the total lens length at the wide-angle end becomes large (elongates) because the movement amount of the first lens unit L1 during the zoom operation becomes small. In accordance with that, it is difficult to reduce the size of the first lens unit L1 because the lens effective diameter is enlarged to ensure a peripheral light intensity. Further, it is difficult to correct the field curvature and the chromatic aberration of magnification at the wide-angle end. On the contrary, when Conditional expression (2) exceeds the upper limit, because the movement amount of the first lens unit L1 during the zoom operation becomes large, the total lens length (a distance from the first lens surface to the image plane) at the telephoto end is elongated and therefore it is difficult to reduce the size. When a lens barrel is retracted in order to reduce a thickness of a camera, the number of the retraction steps increases and also the diameter of the barrel increases. Further, it is not good because an image shake or a shaking sound are increased during the zoom operation along with the increase of the movement amount of the first lens unit L1. The lens effective diameter becomes large when ensuring the periphery at the telephoto end, and it is difficult to reduce the size of the whole system.

Conditional expression (3) appropriately determines a ratio of the movement amount M1 of the first lens unit L1 which contributes to the magnification varying operation with respect to the image plane and the focal length ft of the whole system at the telephoto end in order to reduce the size of the whole system and to widen the field angle and also to increase the zoom ratio. When Conditional expression (3) exceeds the lower limit, the total lens length at the wide-angle end becomes large because the movement amount of the first lens unit L1 during the zoom operation becomes small. In accordance with that, it is difficult to reduce the size of the first lens unit L1 because the lens effective diameter is increased to ensure a peripheral light intensity. Further, it is difficult to correct the field curvature and the chromatic aberration of magnification at the telephoto end. On the contrary, when Conditional expression (3) exceeds the upper limit, because the movement amount of the first lens unit L1 during the zoom operation becomes large, the total lens length at the telephoto end is elongated and therefore it is difficult to reduce the size. When the lens barrel is retracted in order to reduce a thickness of a camera, the number of the retraction steps is increased and also the diameter of the barrel increases. Further, it is not good because an image shake or a shaking sound are increased during the zoom operation along with the increase of the movement amount of the first lens unit L1. The lens effective diameter becomes large when ensuring the periphery at the telephoto end, and it is difficult to reduce the size of the whole system. Further, it is not preferable because the spherical aberration becomes large at the telephoto end.

In each embodiment, as described above, the focal length of the first lens unit L1, the position relation of the first lens unit L1 at the wide-angle end and the at the telephoto end, and the movement amount during the zoom operation are appropriately set so as to satisfy Conditional expressions (1), (2), and (3). Thus, a compact zoom lens which maintains a high optical performance in a whole zoom range and has a wide field angle and a high zoom ratio is achieved. The zoom lens also has a small lens effective diameter, a short retraction length, and is easily assembled at the time of manufacture. More preferably, numerical ranges of Conditional expressions (1) to (3) are set as follows.

$$20.0 < f1/fw < 40.0 \quad (1a)$$

$$8.5 < M1/fw < 30.0 \quad (2a)$$

$$0.3 < M1/ft < 0.7 \quad (3a)$$

In each embodiment, a compact zoom lens which has a wide field angle and a high zoom ratio and has a high optical performance in the whole zoom range can be obtained by the configuration as described above.

In each embodiment, more preferably, at least one of the following conditional expressions is satisfied. The focal lengths of the second lens unit L2 and the third lens unit L3 are defined as f2 and f3, respectively. A total lens length (a distance from the first lens surface to the image plane) at the wide-angle end is defined as Tdw. An interval between the aperture stop SP and the third lens unit L3 at the wide-angle end is defined as dsw. Lateral magnifications of the second lens unit L2 at the wide-angle end and the telephoto end are defined as $\beta 2w$ and $\beta 2t$, respectively. In this case, it is preferable that at least one of the following conditional expressions is satisfied.

$$-0.15 < f2/ft < -0.01 \quad (4)$$

$$0.01 < f3/f1 < 0.25 \quad (5)$$

$$0.01 < Tdw/ft < 1.0 \quad (6)$$

$$0.2 < dsw/fw < 10.0 \quad (7)$$

$$0.05 < \beta 2w/\beta 2t < 0.5 \quad (8)$$

Conditional expression (4) appropriately determines a range of the focal length f2 of the second lens unit L2 which contributes to the magnification varying operation in order to reduce the size of the whole system and also to increase the zoom ratio. When Conditional expression (4) exceeds the lower limit and the focal length f2 (a negative value) of the second lens unit L2 is smaller than the focal length ft of the whole system at the telephoto end, a negative refractive power (an optical power, i.e. an inverse of the focal length) of the second lens unit L2 which contributes to the magnification varying operation is weakened. Therefore, the movement amount of the second lens unit L2 has to be increased in order to increase the zoom ratio, and as a result, the total lens length is elongated and it is difficult to reduce the size of the whole system. It is not preferable because the total lens length at the wide-angle end is elongated and also the lens effective diameter is increased to ensure the peripheral light intensity. Further, it is difficult to correct astigmatism in a zoom intermediate range. On the contrary, when Conditional expression (4) exceeds the upper limit and the focal length f2 of the second lens unit L2 is larger than the focal length ft of the whole system at the wide-angle end, the negative refractive power of the second lens unit L2 which contributes to the magnification varying operation is strengthened. As a result, it is difficult to correct a coma aberration and a field variation between the wide-angle end and the zoom intermediate range. The sensitivity with respect to the deterioration of the optical performance when the second lens unit L2 is decentered is also increased, and therefore assembling the zoom lens is difficult.

Conditional expression (5) appropriately determines a range of the focal length f1 of the first lens unit L1 and a focal length f3 of the third lens unit L3 in order to reduce the size of the whole system and also to increase the zoom ratio. When Conditional expression (5) exceeds the lower limit and the focal length f3 of the third lens unit L3 is smaller (shorter) than the focal length f1 of the first lens unit L1, the movement amount of the first lens unit L1 is increased in accordance with the magnification varying operation, and the total lens length is elongated at the telephoto end. A spherical aberration is also deteriorated at the telephoto end. Further, it is not good because the optical performance is deteriorated at the telephoto end in performing an anti-shake operation by the third lens unit L3. On the contrary, when Conditional expression (5) exceeds the upper limit and the focal length f3 of the third lens unit L3 is larger (longer) than the focal length f1 of the first lens unit L1, the movement amount of the first lens unit L1 in the zoom operation is decreased and the total lens length gets longer at the wide-angle end. The lens effective diameter is also increased in order to prevent the reduction of the peripheral light intensity. Further, it is not good because the decentering sensitivity of the first lens unit L1 is increased and the optical performance is deteriorated.

Conditional expression (6) appropriately determines a range of the total lens length Tdw at the wide-angle end in order to reduce the size of the whole system and also to increase the zoom ratio. When Conditional expression (6) exceeds the lower limit and the total lens length Tdw at the wide-angle end is shortened, it is difficult to correct mainly a field curvature or a distortion at the wide-angle end. In performing a magnification varying operation from the wide-angle end to the telephoto end in order to increase the zoom ratio, when the first lens unit L1 is moved to the object side with respect to the image plane, the total lens length at the telephoto end is elongated and it is difficult to reduce the size. Further, it is not good because the lens effective diameter increases in order to reduce the abrupt reduction of the peripheral light intensity around the telephoto end. On the contrary, when Conditional expression (6) exceeds the upper limit and the total lens length Tdw at the wide-angle end is elongated, it is difficult to reduce the size of the whole system because the lens effective diameter has to be increased in order to prevent the reduction of the peripheral light intensity at around the wide-angle end.

Conditional expression (7) appropriately determines a range of an interval dsw between the aperture stop SP and the third lens unit L3 at the wide-angle end in order to keep a good image quality. When Conditional expression (7) exceeds the lower limit and the interval dsw between the aperture stop SP and the third lens unit L3 at the wide-angle end is narrowed, it is not good because an abrupt reduction of a peripheral light intensity at an intermediate image height between the wide-angle end and the intermediate zoom range is pronounced. Further, the lens effective diameter is increased and it is difficult to reduce the size. When Conditional expression (7) exceeds the upper limit and the interval dsw between the aperture stop SP and the third lens unit L3 at the wide-angle end is widened, it is not good because vignetting is generated for the peripheral light intensity in an extremely peripheral portion of a screen between the wide-angle end and the intermediate zoom range and therefore the absolute amount of the peripheral light intensity has a shortage.

Conditional expression (8) appropriately determines lateral magnifications $\beta 2w$ and $\beta 2t$ of the second lens unit L2 at the wide-angle end and the telephoto end in order to reduce the size of the whole system and also to increase the zoom ratio. When Conditional expression (8) exceeds the lower limit and lateral magnification β2w of the second lens unit L2 at the wide-angle end is too small as compared with the lateral magnification β2t at the telephoto end, the movement amount of the second lens unit L2 is increased in the zoom operation. Therefore, it is not good because the total lens length is increased and also the size of the whole system is increased. On the contrary, when Conditional expression (8) exceeds the upper limit and the lateral magnification β2w of the second lens unit L2 at the wide-angle end is too large as compared with the lateral magnification β2t at the telephoto end, it is difficult to correct the coma aberration and the field variation for the whole zoom range. Further, it is difficult to reduce the size of the whole system because the lens effective diameter is increased.

In order to reduce aberration variations in performing an aberration correcting operation and a zoom operation and also to reduce the size of the whole lens system, it is preferable that numerical ranges of Conditional expressions (4) to (8) are set as follows.

$$-0.12 < f2/ft < -0.03 \quad (4a)$$

$$0.05 < f3/f1 < 0.25 \quad (5a)$$

$$0.3 < Tdw/ft < 1.0 \quad (6a)$$

$$0.2 < dsw/fw < 8.0 \quad (7a)$$

$$0.05 < \beta2w/\beta2t < 0.30 \quad (8a)$$

According to each embodiment, by satisfying the conditional expressions described above, a zoom lens having a high zoom ratio of around 20 and also having a high optical performance in a whole zoom range can be obtained. In the zoom lens, the size of a whole of the optical system is small and a field angle is wide. Further, according to each embodiment, a zoom lens which corrects an image blur generated by the shake (tilt) of the zoom lens and is preferably used for each kind of image pickup apparatuses where an image is stabilized can be obtained.

Subsequently, Numerical embodiments 1 to 6 which correspond to Embodiment 1 to 6 of the present invention respectively will be indicated. In each numerical embodiment, "i" indicates an order of an optical surface from the object side. In each numerical embodiment, "ri" denotes a radius of curvature of an i-th optical surface (an i-th surface), "di" denotes an interval between the i-th surface and the (i+1)-th surface, and "ndi" and "vdi" denote a refractive index and Abbe number of a material of the i-th optical member with respect to a d-line, respectively. An aspherical surface shape is represented by the following expression, where "k" is an eccentricity, "A4", "A6", "A8", and "A10" are aspherical surface coefficients, and "x" is a displacement in an optical axis direction at a position of height "h" from the optical axis with reference to a surface apex.

$$x = (h^2/R)/[1+[1-(1+k)(h/R)^2]^{1/2}] + A4h^4 + A6h^6 + A8h^8 + A10h^{10}$$

In the above expression, "R" is a paraxial radius of curvature. Further, for example, the indication "E-Z" means "$10^{-z}$".

The last two surfaces in each numerical embodiment are surfaces of optical blocks such as a filter or a face plate. In each embodiment, a back focus (BF) is represented by an air conversion length for a distance from a final surface of a lens to a paraxial image plane. The total lens length is obtained by adding the back focus to a distance from a first lens surface which is positioned closest to the object side up to a final surface. In other words, it is a distance from the first lens surface up to the image plane. In Numerical embodiments 1 to 6, "r15" denotes a design dummy surface (an air surface) at the image side of the aperture stop SP. The relation to the conditional expressions described above in each numerical embodiment is shown in Table 1.

[Numerical embodiment 1]

| Surface number | r | d | nd | vd |
|---|---|---|---|---|
| 1 | 153.057 | 1.70 | 1.80610 | 33.3 |
| 2 | 56.611 | 4.80 | 1.49700 | 81.5 |
| 3 | −371.639 | 0.20 | | |
| 4 | 57.012 | 3.60 | 1.63854 | 55.4 |
| 5 | 362.533 | (variable) | | |
| 6 | 84.809 | 1.00 | 1.88300 | 40.8 |
| 7 | 9.400 | 2.20 | | |
| 8 | 19.326 | 0.80 | 1.88300 | 40.8 |
| 9 | 11.638 | 3.10 | | |
| 10 | −29.711 | 0.70 | 1.88300 | 40.8 |
| 11 | 209.523 | 0.20 | | |
| 12 | 19.736 | 2.20 | 1.94595 | 18.0 |
| 13 | 171.363 | (variable) | | |
| 14 (stop) | ∞ | 0.00 | | |
| 15 | ∞ | (variable) | | |
| 16* | 10.920 | 3.00 | 1.58313 | 59.4 |
| 17* | −68.199 | 2.90 | | |
| 18 | 31.202 | 0.70 | 1.84666 | 23.9 |
| 19 | 10.431 | 0.50 | | |
| 20 | 18.136 | 2.00 | 1.48749 | 70.2 |
| 21 | −16.995 | 0.30 | | |
| 22 (flare cut stop) | ∞ | (variable) | | |
| 23 | 50.866 | 1.00 | 1.48749 | 70.2 |
| 24 | 16.232 | (variable) | | |
| 25 | 16.609 | 2.00 | 1.48749 | 70.2 |
| 26 | 84.510 | (variable) | | |
| 27 | ∞ | 1.00 | 1.51633 | 64.1 |
| 28 | ∞ | | | |
| Image plane | ∞ | | | |

Aspherical surface data

Sixteenth surface

K = −1.61056e+000   A4 = 5.88474e−005   A6 = −2.17606e−008
A8 = −1.41631e−008

Seventeenth surface

K = 1.06337e+002   A4 = 8.76505e−005   A6 = 1.48376e−007

Each kind of data
Zoom ratio 28.63

| Focal length | 4.40 | 12.24 | 126.00 | 5.68 | 26.26 | 76.00 |
|---|---|---|---|---|---|---|
| F-number | 2.87 | 4.11 | 5.79 | 3.18 | 4.60 | 5.16 |
| Field angle | 38.40 | 17.57 | 1.76 | 34.31 | 8.39 | 2.92 |
| Image height | 3.49 | 3.88 | 3.88 | 3.88 | 3.88 | 3.88 |
| Total lens length | 91.73 | 90.55 | 144.33 | 88.12 | 108.36 | 136.59 |
| BF | 7.98 | 8.61 | 10.47 | 7.22 | 15.02 | 18.23 |
| d5 | 0.70 | 17.48 | 70.12 | 3.76 | 37.03 | 62.97 |
| d13 | 33.95 | 15.34 | 1.50 | 28.34 | 6.23 | 1.78 |
| d15 | 8.09 | 1.50 | 1.50 | 5.44 | 2.32 | 2.24 |
| d22 | 1.49 | 8.33 | 7.24 | 3.07 | 11.20 | 8.59 |
| d24 | 6.62 | 6.38 | 20.60 | 7.40 | 3.66 | 9.86 |
| d26 | 6.32 | 6.95 | 8.81 | 5.56 | 13.36 | 16.57 |

Zoom lens unit data

| Group | Start surface | Focal length |
|---|---|---|
| 1 | 1 | 94.27 |
| 2 | 6 | −9.71 |
| 3 | 16 | 16.49 |
| 4 | 23 | −49.37 |
| 5 | 25 | 42.00 |

[Numerical embodiment 2]
Unit mm

Surface data

| Surface number | r | d | nd | νd |
|---|---|---|---|---|
| 1 | 200.339 | 1.70 | 1.80610 | 33.3 |
| 2 | 55.193 | 4.80 | 1.49700 | 81.5 |
| 3 | −405.444 | 0.20 | | |
| 4 | 57.441 | 3.60 | 1.77250 | 49.6 |
| 5 | 290.583 | (variable) | | |
| 6 | 45.040 | 1.00 | 1.88300 | 40.8 |
| 7 | 8.549 | 3.00 | | |
| 8 | 46.494 | 0.80 | 1.88300 | 40.8 |
| 9 | 15.757 | 2.40 | | |
| 10 | −32.583 | 0.70 | 1.88300 | 40.8 |
| 11 | −203.364 | 0.20 | | |
| 12 | 20.052 | 2.20 | 1.94595 | 18.0 |
| 13 | 139.009 | (variable) | | |
| 14 (stop) | ∞ | 0.00 | | |
| 15 | ∞ | (variable) | | |
| 16* | 10.224 | 3.00 | 1.58313 | 59.4 |
| 17* | −110.324 | 3.13 | | |
| 18 | 33.261 | 0.70 | 1.84666 | 23.9 |
| 19 | 10.270 | 0.50 | | |
| 20 | 29.207 | 2.00 | 1.48749 | 70.2 |
| 21 | −19.306 | 0.30 | | |
| 22 (flare cut stop) | ∞ | (variable) | | |
| 23 | 21.830 | 2.00 | 1.48749 | 70.2 |
| 24 | 87.057 | (variable) | | |
| 25 | ∞ | 1.00 | 1.51633 | 64.1 |
| 26 | ∞ | | | |
| Image plane | ∞ | | | |

Aspherical surface data

Sixteenth surface

K = −1.98557e+000    A4 = 1.18348e−004    A6 = −4.37232e−007
A8 = −2.02908e−009

Seventeenth surface

K = 1.66321e+002    A4 = 2.36275e−005

Each kind of data
Zoom ratio 28.63

| Focal length | 4.40 | 13.75 | 126.00 | 5.83 | 33.00 | 68.24 |
|---|---|---|---|---|---|---|
| F-number | 2.87 | 4.03 | 6.00 | 3.09 | 4.78 | 5.16 |
| Field angle | 38.40 | 15.73 | 1.76 | 33.62 | 6.70 | 3.25 |
| Image height | 3.49 | 3.88 | 3.88 | 3.88 | 3.88 | 3.88 |
| Total lens length | 90.90 | 95.70 | 149.00 | 88.57 | 117.71 | 137.72 |
| BF | 11.46 | 19.01 | 12.45 | 12.16 | 25.50 | 23.94 |
| d5 | 0.70 | 23.54 | 70.65 | 5.18 | 46.11 | 62.26 |
| d13 | 28.62 | 13.80 | 1.50 | 24.18 | 6.14 | 2.54 |
| d15 | 13.40 | 1.79 | 1.50 | 8.97 | 1.64 | 2.22 |
| d22 | 4.50 | 5.33 | 30.67 | 5.85 | 6.09 | 14.53 |
| d24 | 9.80 | 17.35 | 10.79 | 10.50 | 23.84 | 22.28 |

Zoom lens unit data

| Group | Start surface | Focal length |
|---|---|---|
| 1 | 1 | 94.82 |
| 2 | 6 | −10.14 |
| 3 | 16 | 19.71 |
| 4 | 23 | 59.17 |

[Numerical embodiment 3]
Unit mm

Surface data

| Surface number | r | d | nd | νd |
|---|---|---|---|---|
| 1 | 201.982 | 1.70 | 1.80610 | 33.3 |
| 2 | 55.176 | 4.80 | 1.49700 | 81.5 |
| 3 | −400.383 | 0.20 | | |
| 4 | 57.434 | 3.60 | 1.77250 | 49.6 |
| 5 | 289.310 | (variable) | | |
| 6 | 45.476 | 1.00 | 1.88300 | 40.8 |
| 7 | 8.621 | 3.00 | | |
| 8 | 45.507 | 0.80 | 1.88300 | 40.8 |
| 9 | 15.484 | 2.40 | | |
| 10 | −31.976 | 0.70 | 1.88300 | 40.8 |
| 11 | −209.188 | 0.20 | | |
| 12 | 20.238 | 2.20 | 1.94595 | 18.0 |
| 13 | 165.651 | (variable) | | |
| 14 (stop) | ∞ | 0.00 | | |
| 15 | ∞ | (variable) | | |
| 16* | 10.476 | 3.00 | 1.58313 | 59.4 |
| 17* | −109.714 | 3.19 | | |
| 18 | 33.725 | 0.70 | 1.84666 | 23.9 |
| 19 | 10.497 | 0.50 | | |
| 20 | 27.571 | 2.00 | 1.48749 | 70.2 |
| 21 | −19.367 | 0.30 | | |
| 22 (flare cut stop) | ∞ | (variable) | | |
| 23 | 22.820 | 2.00 | 1.48749 | 70.2 |
| 24 | 52.535 | (variable) | | |
| 25 | 61.754 | 1.50 | 1.48749 | 70.2 |
| 26 | 234.087 | (variable) | | |
| 27 | ∞ | 1.00 | 1.51633 | 64.1 |
| 28 | ∞ | | | |
| Image plane | ∞ | | | |

Aspherical surface data

Sixteenth surface

K = −2.02238e+000    A4 = 1.16754e−004    A6 = −3.86292e−007
A8 = −2.33352e−009

Seventeenth surface

K = 1.53505e+002    A4 = 2.84066e−005

Each kind of data
Zoom ratio 28.70

| Focal length | 4.39 | 13.56 | 126.00 | 5.78 | 32.76 | 68.05 |
|---|---|---|---|---|---|---|
| F-number | 2.87 | 3.97 | 6.00 | 3.09 | 4.79 | 5.21 |
| Field angle | 38.47 | 15.95 | 1.76 | 33.82 | 6.75 | 3.26 |
| Image height | 3.49 | 3.88 | 3.88 | 3.88 | 3.88 | 3.88 |
| Total lens length | 92.51 | 97.12 | 150.34 | 90.12 | 119.05 | 139.05 |
| BF | 6.81 | 6.81 | 6.81 | 6.81 | 6.81 | 6.81 |
| d5 | 0.70 | 23.36 | 70.50 | 5.12 | 45.90 | 62.08 |
| d13 | 28.06 | 14.45 | 1.54 | 24.04 | 6.85 | 2.88 |
| d15 | 14.55 | 1.81 | 1.76 | 9.74 | 1.50 | 2.29 |
| d22 | 5.61 | 4.75 | 34.50 | 6.80 | 4.39 | 13.57 |
| d24 | 3.00 | 12.14 | 1.45 | 3.82 | 19.82 | 17.63 |
| d26 | 5.15 | 5.15 | 5.15 | 5.15 | 5.15 | 5.15 |

Zoom lens unit data

| Group | Start Surface | Focal length |
|---|---|---|
| 1 | 1 | 95.06 |
| 2 | 6 | −10.16 |
| 3 | 16 | 19.64 |
| 4 | 23 | 80.97 |
| 5 | 25 | 171.58 |

[Numerical embodiment 4]

Unit mm
Surface data

| Surface number | r | d | nd | vd |
|---|---|---|---|---|
| 1 | 307.978 | 1.70 | 1.80610 | 33.3 |
| 2 | 85.602 | 3.80 | 1.49700 | 81.5 |
| 3 | −610.374 | 0.20 | | |
| 4 | 75.989 | 3.00 | 1.77250 | 49.6 |
| 5 | 228.098 | (variable) | | |
| 6 | 28.794 | 1.00 | 1.88300 | 40.8 |
| 7 | 9.652 | 2.80 | | |
| 8 | 20.368 | 0.80 | 1.88300 | 40.8 |
| 9 | 13.623 | 3.50 | | |
| 10 | −34.305 | 0.70 | 1.88300 | 40.8 |
| 11 | 56.477 | 0.20 | | |
| 12 | 22.818 | 2.20 | 1.94595 | 18.0 |
| 13 | 394.804 | (variable) | | |
| 14(stop) | ∞ | 0.00 | | |
| 15 | ∞ | (variable) | | |
| 16* | 10.237 | 3.00 | 1.58313 | 59.4 |
| 17* | −79.569 | 1.82 | | |
| 18 | 31.410 | 0.70 | 1.84666 | 23.9 |
| 19 | 11.348 | 0.90 | | |
| 20 | 35.371 | 2.00 | 1.48749 | 70.2 |
| 21 | −19.032 | 0.30 | | |
| 22(flare cut stop) | ∞ | (variable) | | |
| 23 | 18.619 | 1.00 | 1.48749 | 70.2 |
| 24 | 10.303 | (variable) | | |
| 25 | 14.182 | 2.00 | 1.48749 | 70.2 |
| 26 | 32.840 | (variable) | | |
| 27 | ∞ | 1.00 | 1.51633 | 64.1 |
| 28 | ∞ | | | |
| Image plane | ∞ | | | |

Aspherical surface data

Sixteenth surface

K = −1.63057e+000    A 4 = 7.79666e−005    A 6 = 1.05864e−008
A 8 = −1.53239e−009

Seventeenth surface

K = 2.52046e+001    A 4 = 4.21229e−005

Each kind of data
Zoom ratio
40.83

| | | | | | | |
|---|---|---|---|---|---|---|
| Focal length | 4.41 | 13.71 | 179.98 | 5.81 | 35.23 | 82.24 |
| F-number | 2.63 | 4.80 | 8.46 | 3.16 | 5.90 | 6.62 |
| Field angle | 38.35 | 15.78 | 1.23 | 33.69 | 6.28 | 2.70 |
| Image height | 3.49 | 3.88 | 3.88 | 3.88 | 3.88 | 3.88 |
| Total lens length | 100.91 | 108.27 | 199.75 | 97.50 | 144.21 | 179.24 |
| BF | 10.12 | 16.60 | 8.39 | 10.88 | 24.18 | 23.63 |
| d 5 | 0.70 | 27.91 | 110.83 | 4.81 | 63.99 | 94.03 |
| d13 | 37.93 | 15.77 | 1.40 | 31.21 | 5.74 | 2.03 |
| d15 | 14.23 | 4.71 | 1.41 | 10.64 | 3.98 | 3.15 |
| d22 | 2.36 | 2.08 | 18.57 | 1.64 | 5.90 | 12.70 |
| d24 | 3.95 | 9.58 | 27.53 | 6.71 | 8.80 | 12.08 |
| d26 | 8.46 | 14.94 | 6.73 | 9.22 | 22.52 | 21.97 |

Zoom lens unit data

| Group | Start surface | Focal length |
|---|---|---|
| 1 | 1 | 150.00 |
| 2 | 6 | −11.68 |
| 3 | 16 | 17.90 |
| 4 | 23 | −49.26 |
| 5 | 25 | 49.47 |

[Numerical embodiment 5]

Unit mm
Surface data

| Surface number | r | d | nd | vd |
|---|---|---|---|---|
| 1 | 108.712 | 1.60 | 1.80610 | 33.3 |
| 2 | 47.557 | 4.40 | 1.49700 | 81.5 |
| 3 | 3130.394 | 0.20 | | |
| 4 | 49.171 | 3.50 | 1.63854 | 55.4 |
| 5 | 260.112 | (variable) | | |
| 6 | 73.003 | 1.00 | 1.88300 | 40.8 |
| 7 | 8.761 | 2.50 | | |
| 8 | 24.738 | 0.80 | 1.88300 | 40.8 |
| 9 | 12.160 | 2.70 | | |
| 10 | −26.193 | 0.70 | 1.83481 | 42.7 |
| 11 | 1132.750 | 0.20 | | |
| 12 | 20.450 | 2.00 | 1.94595 | 18.0 |
| 13 | 1069.346 | (variable) | | |
| 14 (stop) | ∞ | 0.00 | | |
| 15 | ∞ | (variable) | | |
| 16* | 9.088 | 3.00 | 1.58313 | 59.4 |
| 17* | −95.386 | 2.26 | | |
| 18 | 25.376 | 0.70 | 1.84666 | 23.9 |
| 19 | 8.716 | 0.50 | | |
| 20 | 16.452 | 2.00 | 1.48749 | 70.2 |
| 21 | −17.657 | 0.30 | | |
| 22 | ∞ | (variable) | | |
| 23 | 103.328 | 1.00 | 1.48749 | 70.2 |
| 24 | 23.001 | (variable) | | |
| 25 | 18.250 | 2.00 | 1.48749 | 70.2 |
| 26 | 202.492 | (variable) | | |
| 27 | ∞ | 1.00 | 1.51633 | 64.1 |
| 28 | ∞ | (variable) | | |
| Image plane | ∞ | | | |

Aspherical surface data

Sixteenth surface

K = −1.34841e+000    A4 = 1.02225e−004    A6 = 2.58085e−007
A8 = 4.57761e−009

Seventeenth surface

K = 3.36394e+001    A4 = 7.51650e−005

Each kind of data
Zoom ratio 23.87

| | | | | | | |
|---|---|---|---|---|---|---|
| Focal length | 4.40 | 14.60 | 105.00 | 5.78 | 40.51 | 86.13 |
| F-number | 2.85 | 4.41 | 6.00 | 3.14 | 5.22 | 5.41 |
| Field angle | 38.41 | 14.86 | 2.11 | 33.82 | 5.46 | 2.58 |
| Image height | 3.49 | 3.88 | 3.88 | 3.88 | 3.88 | 3.88 |
| Total lens length | 81.46 | 89.10 | 138.23 | 79.12 | 114.80 | 134.20 |
| BF | 7.87 | 14.99 | 10.37 | 8.99 | 20.90 | 15.03 |
| d5 | 0.70 | 23.51 | 62.17 | 4.61 | 47.46 | 60.69 |
| d13 | 31.32 | 10.24 | 1.53 | 24.26 | 3.40 | 1.50 |
| d15 | 3.74 | 1.50 | 1.50 | 2.92 | 1.55 | 1.68 |
| d22 | 2.17 | 4.59 | 5.45 | 2.66 | 5.22 | 5.21 |
| d24 | 4.31 | 2.92 | 25.85 | 4.31 | 4.92 | 18.74 |
| d26 | 6.21 | 13.33 | 8.71 | 7.33 | 19.24 | 13.37 |

Zoom lens unit data

| Group | Start surface | Focal length |
|---|---|---|
| 1 | 1 | 88.47 |
| 2 | 6 | −9.16 |
| 3 | 16 | 15.69 |
| 4 | 23 | −60.94 |
| 5 | 25 | 41.00 |

[Numerical embodiment 6]
Unit mm

Surface data

| Surface number | r | d | nd | vd |
|---|---|---|---|---|
| 1 | 340.091 | 1.70 | 1.80610 | 33.3 |
| 2 | 84.993 | 4.00 | 1.49700 | 81.5 |
| 3 | −381.518 | 0.20 | | |
| 4 | 71.329 | 3.20 | 1.77250 | 49.6 |
| 5 | 202.443 | (variable) | | |
| 6 | 29.162 | 1.00 | 1.88300 | 40.8 |
| 7 | 9.781 | 2.60 | | |
| 8 | 21.139 | 0.80 | 1.88300 | 40.8 |
| 9 | 12.616 | 3.50 | | |
| 10 | −32.545 | 0.70 | 1.88300 | 40.8 |
| 11 | 78.404 | 0.20 | | |
| 12 | 23.282 | 2.20 | 1.94595 | 18.0 |
| 13 | 1165.084 | (variable) | | |
| 14 (stop) | ∞ | 0.00 | | |
| 15 | ∞ | (variable) | | |
| 16* | 10.449 | 3.00 | 1.58313 | 59.4 |
| 17* | −78.459 | 2.21 | | |
| 18 | 32.505 | 0.70 | 1.84666 | 23.9 |
| 19 | 11.179 | 0.70 | | |
| 20 | 25.703 | 2.00 | 1.48749 | 70.2 |
| 21 | −22.670 | 0.30 | | |
| 22 (flare cut stop) | ∞ | (variable) | | |
| 23 | 16.271 | 1.00 | 1.48749 | 70.2 |
| 24 | 10.044 | (variable) | | |
| 25 | 13.957 | 2.00 | 1.48749 | 70.2 |
| 26 | 38.035 | (variable) | | |
| 27 | ∞ | 1.00 | 1.51633 | 64.1 |
| 28 | ∞ | | | |
| Image plane | ∞ | | | |

Aspherical surface data

Sixteenth surface

K = −1.30931e+000   A4 = 3.70640e−005   A6 = 2.68934e−008
A8 = −1.22390e−009

Seventeenth surface

K = 5.76692e+001   A4 = 3.67189e−005

Each kind of data
Zoom ratio 34.07

| | | | | | | |
|---|---|---|---|---|---|---|
| Focal length | 4.40 | 13.59 | 150.00 | 5.81 | 33.76 | 75.16 |
| F-number | 2.50 | 4.42 | 7.51 | 2.98 | 5.37 | 6.09 |
| Field angle | 38.39 | 15.92 | 1.48 | 33.72 | 6.55 | 2.95 |
| Image height | 3.49 | 3.88 | 3.88 | 3.88 | 3.88 | 3.88 |
| Total lens length | 99.61 | 105.16 | 189.40 | 95.97 | 138.17 | 170.48 |
| BF | 9.73 | 15.49 | 12.19 | 10.23 | 22.68 | 22.48 |
| d5 | 0.70 | 26.13 | 101.56 | 4.61 | 59.19 | 86.41 |
| d13 | 34.90 | 13.12 | 1.49 | 28.16 | 4.13 | 1.49 |
| d15 | 15.80 | 6.33 | 1.49 | 12.30 | 5.07 | 3.62 |
| d22 | 2.09 | 2.71 | 19.52 | 1.65 | 6.85 | 13.68 |
| d24 | 4.38 | 9.36 | 21.14 | 7.01 | 8.23 | 10.78 |
| d26 | 8.07 | 13.83 | 10.53 | 8.57 | 21.02 | 20.83 |

Zoom lens unit data

| Group | Start surface | Focal length |
|---|---|---|
| 1 | 1 | 140.00 |
| 2 | 6 | −11.58 |
| 3 | 16 | 18.30 |
| 4 | 23 | −56.83 |
| 5 | 25 | 44.03 |

TABLE 1

| CONDITIONAL EXPRESSION | EMBODIMENT 1 | EMBODIMENT 2 | EMBODIMENT 3 |
|---|---|---|---|
| 1) $20.0 < f1/fw < 50.0$ | 21.4 | 21.5 | 21.7 |
| 2) $7.50 < M1/fw < 40.00$ | 11.95 | 13.20 | 13.17 |
| 3) $0.20 < M1/ft < 0.80$ | 0.42 | 0.46 | 0.46 |
| 4) $−0.150 < f2/ft < −0.010$ | −0.077 | −0.080 | −0.081 |
| 5) $0.010 < f3/f1 < 0.250$ | 0.175 | 0.208 | 0.207 |
| 6) $0.01 < Tdw/ft < 1.0$ | 0.73 | 0.72 | 0.73 |
| 7) $0.2 < dsw/fw < 10.0$ | 1.84 | 3.04 | 3.31 |
| 8) $0.050 < \beta 2w/\beta 2t < 0.50$ | 0.132 | 0.134 | 0.139 |

| CONDITIONAL EXPRESSION | EMBODIMENT 4 | EMBODIMENT 5 | EMBODIMENT 6 |
|---|---|---|---|
| 1) $20.0 < f1/fw < 50.0$ | 34.0 | 20.1 | 31.8 |
| 2) $7.50 < M1/fw < 40.00$ | 22.43 | 12.91 | 20.40 |
| 3) $0.20 < M1/ft < 0.80$ | 0.55 | 0.54 | 0.60 |
| 4) $−0.150 < f2/ft < −0.010$ | −0.065 | −0.087 | −0.077 |
| 5) $0.010 < f3/f1 < 0.250$ | 0.119 | 0.177 | 0.131 |
| 6) $0.01 < Tdw/ft < 1.0$ | 0.56 | 0.78 | 0.66 |
| 7) $0.2 < dsw/fw < 10.0$ | 3.23 | 0.85 | 3.59 |
| 8) $0.050 < \beta 2w/\beta 2t < 0.50$ | 0.171 | 0.172 | 0.180 |

Next, an embodiment of a digital still camera which uses the zoom lens described in each embodiment as an image pickup optical system will be described with reference to FIG. 13. In FIG. 13, reference numeral 20 denotes a camera body, and reference numeral 21 denotes an image pickup optical system which is constituted by any one of the zoom lenses described in Embodiments 1 to 6. Reference numeral 22 denotes a solid-state image pickup element (a photoelectric conversion element) such as a CCD sensor or a CMOS sensor which receives light of an object image formed by the image pickup optical system 21. Reference numeral 23 denotes a memory which stores information corresponding to the object image for which a photoelectric conversion has been performed by the solid-state image pickup element 22. Reference numeral 24 denotes a finder which is constituted by a liquid crystal display panel or the like, and is used for observing the object image formed on the solid-state image pickup element 22. Thus, the zoom lens of the present invention is applied to an image pickup apparatus such as a digital still camera to realize a small-sized image pickup apparatus which has a high optical performance.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-126205, filed on May 26, 2009, which is hereby incorporated by reference herein in its entirety.

What is claimed is:

1. A zoom lens comprising:

a first lens unit having a positive refractive power, a second lens unit having a negative refractive power, a third lens unit having a positive refractive power, and a rear group including at least one lens unit, in order from an object side to an image side, wherein each of the lens units is configured to move so that a total lens length at a telephoto end is longer than that at a wide-angle end to perform a zoom operation, and wherein the conditional expressions $20.0 < f1/fw < 50.0$ $7.5 < M1/fw < 40.0$ $0.2 < M1/ft < 0.8$ are satisfied, where M1 is a movement amount of the first lens unit when zooming from the wide-angle end to the telephoto end with respect to an imaging surface, f1 is a focal length of the first lens unit, and fw and ft are focal lengths of a whole system at the wide-angle end and the telephoto end.

2. A zoom lens according to claim 1, wherein the conditional expression $-0.15 < f2/ft < -0.01$ is satisfied, wherein f2 is a focal length of the second lens unit.

3. A zoom lens according to claim 1, wherein the conditional expression $0.01 < f3/f1 < 0.25$ is satisfied, where f3 is a focal length of the third lens unit.

4. A zoom lens according to claim 1, wherein the conditional expression $0.01 < Tdw/ft < 1.0$ is satisfied, where Tdw is a total lens length of the zoom lens at the wide-angle end.

5. A zoom lens according to claim 1, wherein the first lens unit includes a negative lens, a positive lens, and a positive lens, in order from the object side to the image side.

6. A zoom lens according to claim 1, wherein the third lens unit includes one negative lens and two positive lenses.

7. A zoom lens according to claim 1, further comprising an aperture stop at the object side of the third lens unit, and
    wherein the conditional expression $0.2 < dsw/fw < 10.0$ is satisfied, where dsw is an interval between the aperture stop and the third lens unit at the wide-angle end.

8. A zoom lens according to claim 1, wherein the conditional expression $0.05 < \beta 2w/\beta 2t < 0.5$ is satisfied, where $\beta 2w$ and $\beta 2t$ are lateral magnifications of the second lens unit at the wide-angle end and at the telephoto end, respectively.

9. A zoom lens according to claim 1, wherein the third lens unit is configured to move in a direction having a component perpendicular to an optical axis to correct an image blur which is caused by a shake of the zoom lens.

10. A zoom lens according to claim 1, wherein the rear group consists of a fourth lens unit having a negative refractive power and a fifth lens unit having a positive refractive power in order from the object side to the image side, and wherein each of the fourth lens unit and the fifth lens unit are configured to move in the zoom operation.

11. A zoom lens according to claim 1, wherein the rear group consists of a fourth lens unit having a positive refractive power, and wherein each of the lens units is configured to move in the zoom operation.

12. A zoom lens according to claim 1, wherein the rear group consists of a fourth lens unit having a positive refractive power and a fifth lens unit having a positive refractive power in order from the object side to the image side, and wherein the first to fifth lens units are configured to move in the zoom operation.

13. A zoom lens according to claim 1, further comprising an aperture stop at the object side of the third lens unit, and
    wherein the aperture stop is configured to move independently in the zoom operation.

14. A zoom lens according to claim 1, further comprising a solid-state image pickup element on which an image is formed.

15. An image pickup apparatus comprising:
    a zoom lens; and
    a solid-state image pickup element configured to receive light of an image formed by the zoom lens,
    wherein the zoom lens comprises a first lens unit having a positive refractive power, a second lens unit having a negative refractive power, a third lens unit having a positive refractive power, and a rear group including at least one lens unit, in order from an object side to an image side,
    wherein each of the lens units is configured to move so that a total lens length at a telephoto end is longer than that at a wide-angle end to perform a zoom operation, and
    wherein the conditional expressions $20.0 < f1/fw < 50.0$ $7.5 < M1/fw < 40.0$ $0.2 < M1/ft < 0.8$ are satisfied, where M1 is a movement amount of the first lens unit when zooming from the wide-angle end to the telephoto end with respect to an imaging surface, f1 is a focal length of the first lens unit, and fw and ft are focal lengths of a whole system at the wide-angle end and the telephoto end.

16. A zoom lens comprising:
    a first lens unit having a positive refractive power, a second lens unit having a negative refractive power, a third lens unit having a positive refractive power, a fourth lens unit having a positive refractive power, and a fifth lens unit having a positive refractive power, in order from an object side to an image side,
    wherein the first to fourth lens units are configured to move so that a total lens length at a telephoto end is longer than that at a wide-angle end to perform a zoom operation, and the fifth lens unit is configured not to move in the zoom operation, and
    wherein the conditional expressions $20.0 < f1/fw < 50.0$ $7.5 < M1/fw < 40.0$ $0.2 < M1/ft < 0.8$ are satisfied, where M1 is a movement amount of the first lens unit when zooming from the wide-angle end to the telephoto end with respect to an imaging surface, f1 is a focal length of the first lens unit, and fw and ft are focal lengths of a whole system at the wide-angle end and the telephoto end.

* * * * *